US012781859B2

(12) United States Patent
Pifer et al.

(10) Patent No.: US 12,781,859 B2
(45) Date of Patent: Nov. 3, 2026

(54) FUEL TANK VALVE ASSEMBLY

(71) Applicant: Eaton Intelligent Power Limited, Dublin (IE)

(72) Inventors: Daniel Lee Pifer, Chelsea, MI (US); Abhinav Kumar Sharma, Munger (IN); Chandan Mohapatra, Puri (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 19/244,718

(22) Filed: Jun. 20, 2025

(65) Prior Publication Data

US 2025/0314310 A1 Oct. 9, 2025

Related U.S. Application Data

(63) Continuation of application No. PCT/EP2024/025035, filed on Jan. 19, 2024.

(30) Foreign Application Priority Data

Jan. 20, 2023 (IN) ............................. 202311003998

(51) Int. Cl.

*F16K 7/12* (2006.01)
*B60K 15/03* (2006.01)
*B60K 15/035* (2006.01)
*F16K 31/18* (2006.01)

(52) U.S. Cl.

CPC ................ *F16K 7/12* (2013.01); *B60K 15/03* (2013.01); *B60K 15/03519* (2013.01);
(Continued)

(58) Field of Classification Search

CPC ........... F16K 7/12; F16K 31/18; B60K 15/03; B60K 15/03519; B60K 15/035;
(Continued)

(56) References Cited

U.S. PATENT DOCUMENTS 8,230,873 B2 7/2012 Martin
9,403,432 B2 8/2016 Vulkan
(Continued)

FOREIGN PATENT DOCUMENTS

BR P10709810 A2 7/2011
BR PI0514547 B1 5/2018
(Continued)

OTHER PUBLICATIONS

International search report and Written Opinion received for PCT Application No. PCT/EP2024/025035, 10 pages.

*Primary Examiner* — John Bastianelli
(74) *Attorney, Agent, or Firm* — Stinson LLP

(57) ABSTRACT

A valve assembly includes a housing having an inner chamber, a float assembly provided within the inner chamber, and an elongated membrane. The inner chamber is provided with a vent orifice in fluid communication with a vent outlet. The float assembly is movable along a longitudinal axis of the housing, and includes an angled platform disposed on an upper surface of the float assembly. The membrane includes a first end secured to a first attachment of the float assembly, a second end provided opposite the first end and secured to a second attachment of the float assembly, and a slack portion associated with the second end.

20 Claims, 16 Drawing Sheets

(52) U.S. Cl.
CPC .... *F16K 31/18* (2013.01); *B60K 2015/03256* (2013.01); *B60K 2015/03276* (2013.01); *B60K 2015/03289* (2013.01); *B60K 2015/03296* (2013.01); *B60K 15/035* (2013.01); *B60K 2015/03514* (2013.01)

(58) Field of Classification Search
CPC ........... B60K 2015/03256; B60K 2015/03276; B60K 2015/03289; B60K 2015/03296; B60K 2015/03514
See application file for complete search history.

(56) References Cited

U.S. PATENT DOCUMENTS

| | | | | |
|---|---|---|---|---|
| 10,323,769 | B2 * | 6/2019 | Vulkan | F16K 31/128 |
| 2009/0071543 | A1 | 3/2009 | Vulkan | |
| 2015/0090346 | A1 | 4/2015 | Erdmann | |
| 2019/0113149 | A1 * | 4/2019 | Mihara | B60K 15/03519 |
| 2019/0210453 | A1 * | 7/2019 | Kim | B60K 15/03 |
| 2019/0255938 | A1 | 8/2019 | Mensch | |

FOREIGN PATENT DOCUMENTS

| | | | |
|---|---|---|---|
| BR | 112019016552 | A2 | 3/2020 |
| BR | 112013023008 | B1 | 8/2021 |
| DE | 202021103120 | U1 | 6/2022 |
| EP | 2611639 | A1 | 7/2013 |
| JP | 2001254650 | A | 9/2001 |
| JP | 2009536593 | A | 10/2009 |
| JP | 2013536926 | A | 9/2013 |
| JP | 2015521264 | A | 7/2015 |

* cited by examiner

FUEL TANK VALVE ASSEMBLY

PRIORITY

This application claims the benefit under 35 U.S.C. § 365(c) of International Patent Application No. PCT/EP2024/025035, filed 19 Jan. 2024, which claims the benefit under 35 U.S.C. § 119(a) of Indian Patent Application No. 202311003998, filed 20 Jan. 2023, which is incorporated herein by reference.

TECHNICAL FIELD

The field of the invention relates generally to fuel storage systems for vehicles, and more specifically, to devices that enable safe venting of fuel vapors while preventing unintentional leakage of liquid fuel.

BACKGROUND

Fuel tanks of vehicles require systems and devices that permit safe, consistent operation under a range of conditions. Reliable performance of these safety systems is particularly critical in view of the high flammability and high energy density of fuel.

For instance, safety systems are needed to ensure that vapors released by the liquid fuel stored within the tank are safely released, rather than allowed to build up pressure within the fuel tank. For instance, a rise in ambient temperature and/or strong solar radiation may raise the temperature of the fuel tank and its contents, increasing the rate of forming fuel vapors.

As another example, if a device or feature for safely allowing vapors of liquid fuels to be released from the tank is provided, further safety features are needed to ensure that the vapor release path does not function as a liquid fuel release path, i.e., to prevent unintentional leakage. For instance, if a tank is over-filled during refueling, liquid fuel level may leak through a passage that is intended for release of fuel vapors, unless the risk is anticipated and mitigated.

As a further example, if the fuel vapor release passage is sealed against leakage based on an over-filling event, the design of the above-mentioned safety features needs to ensure that full functionality of safety systems (such as fuel vapor release) is promptly restored when the fuel level subsequently decreases, or when normal operational conditions are restored.

SUMMARY OF PARTICULAR EMBODIMENTS

The present disclosure relates to inventive features that enable and improve performance relating to safe venting of fuel vapors and sealing against leakage of liquid fuel from fuel tanks of vehicles.

In particular embodiments, which may combine the features of some or all of the above embodiments, a valve assembly includes a housing having an inner chamber, an upper surface of the inner chamber provided with a vent orifice in fluid communication with a vent outlet; a float assembly provided within the inner chamber, the float assembly movable along a longitudinal axis of the housing, the float assembly including a platform disposed on an upper surface of the float assembly, the platform angled relative to a plane orthogonal to the longitudinal axis; and a membrane elongated along a lengthwise axis and including a first end secured to a first attachment of the float assembly, a second end provided opposite the first end and secured to a second attachment of the float assembly, and a slack portion associated with the second end, wherein, corresponding to an uppermost position of the float assembly along the longitudinal axis, the membrane is configured to cover and seal the vent orifice, at least a portion of the membrane being supported by the platform, wherein, based on the float assembly moving away from the uppermost position, the membrane is configured to reopen the vent orifice, the reopening associated with the first end initiating a peeling away of the membrane from the vent orifice, and wherein at least a part of the slack portion of the membrane includes a curvature about an axis perpendicular to the lengthwise axis of the membrane.

In particular embodiments, which may combine the features of some or all of the above embodiments, the vent orifice includes an elongated section aligned with the lengthwise axis of the membrane. In particular embodiments, which may combine the features of some or all of the above embodiments, the slack portion of the membrane facilitates the sealing of the vent orifice by facilitating alignment and constraint of the membrane relative to the vent orifice. In particular embodiments, which may combine the features of some or all of the above embodiments, an upper surface of the platform includes a cavity.

In particular embodiments, which may combine the features of some or all of the above embodiments, the cavity includes an elongated section aligned with the lengthwise axis of the platform. In particular embodiments, which may combine the features of some or all of the above embodiments, the cavity includes a protruding ridge oriented along the lengthwise axis of the platform.

In particular embodiments, which may combine the features of some or all of the above embodiments, the platform includes a channel or a groove provided at a peripheral edge of the cavity. In particular embodiments, which may combine the features of some or all of the above embodiments, the float assembly further includes a hollow core section. In particular embodiments, which may combine the features of some or all of the above embodiments, the hollow core section of the float assembly is slidably coupled to the housing of the valve assembly.

In particular embodiments, which may combine the features of some or all of the above embodiments, the first attachment is offset from the second attachment along the longitudinal axis, the first attachment offset toward the upper surface of the inner chamber relative to the second attachment. In particular embodiments, which may combine the features of some or all of the above embodiments, the platform is angled relative to the plane orthogonal to the longitudinal axis at an angle between five and thirty degrees.

In particular embodiments, which may combine the features of some or all of the above embodiments, the membrane includes a fluoroelastomer. In particular embodiments, which may combine the features of some or all of the above embodiments, the fluoroelastomer is reinforced by one or more polymers. In particular embodiments, which may combine the features of some or all of the above embodiments, corresponding to the uppermost position of the float assembly, at least a portion of the membrane is sandwiched between the platform and the vent orifice to seal the vent orifice.

In particular embodiments, which may combine the features of some or all of the above embodiments, the valve assembly includes a clip fastener for securing at least one of the first end or the second end of the membrane to the respective attachment of the float assembly. In particular embodiments, which may combine the features of some or all of the above embodiments, the clip fastener includes a post configured to operatively couple with the float assembly.

In particular embodiments, which may combine the features of some or all of the above embodiments, the membrane includes at least one through-hole configured to engage with the post. In particular embodiments, which may combine the features of some or all of the above embodiments, the clip fastener includes one or more of a hook or a notch configured to operatively couple with the float assembly.

In particular embodiments, which may combine the features of some or all of the above embodiments, a valve assembly system includes a first valve assembly; a second valve assembly in fluid communication with the first valve assembly; and a vent outlet in fluid communication with the first valve assembly, wherein the first valve assembly includes: a housing having an inner chamber, an upper surface of the inner chamber provided with a vent orifice in fluid communication with the vent outlet; a float assembly provided within the inner chamber, the float assembly movable along a longitudinal axis of the housing, the float assembly including a platform disposed on an upper surface of the float assembly, the platform angled relative to a plane orthogonal to the longitudinal axis; and a membrane elongated along a lengthwise axis and including a first end secured to a first attachment of the float assembly, a second end provided opposite the first end and secured to a second attachment of the float assembly, and a slack portion associated with the second end, wherein, corresponding to an uppermost position of the float assembly along the longitudinal axis, the membrane is configured to cover and seal the vent orifice, at least a portion of the membrane being supported by the platform, wherein, based on the float assembly moving away from the uppermost position, the membrane is configured to reopen the vent orifice, the reopening associated with the first end initiating a peeling away of the membrane from the vent orifice, and wherein at least a part of the slack portion of the membrane includes a curvature about an axis perpendicular to the lengthwise axis of the membrane.

In particular embodiments, which may combine the features of some or all of the above embodiments, a method of assembling a valve assembly includes providing a float assembly within a housing of the valve assembly based on slidably coupling a core section of the float assembly with one or more guiding structures of the housing; providing a platform on an upper surface of the float assembly, the platform angled relative to a plane orthogonal to a longitudinal axis of the housing; securing a first end of a membrane to a first attachment of the float assembly, wherein the membrane is elongated along a lengthwise axis, and wherein, corresponding to an uppermost position of the float assembly along the longitudinal axis, the membrane is configured to cover and seal a vent orifice and at least a portion of the membrane is supported by the platform; and securing a second end of the membrane to a second attachment of the float assembly, wherein a slack portion of the membrane is associated with the second end, and wherein at least a part of the slack portion of the membrane includes a curvature about an axis perpendicular to the lengthwise axis of the membrane.

In particular embodiments, which may combine the features of some or all above embodiments, a flexible ribbon is provided for sealing the valve orifice against liquid fuel leakage, along with an inclined lower surface of the valve orifice, and a corresponding inclined ramp on a float.

In particular embodiments, which may combine the features of some or all above embodiments, the two ends of the flexible ribbon are coupled to the float upper surface at respective ribbon attachments.

In particular embodiments, which may combine the features of some or all above embodiments, the upper end of the ribbon is coupled to an upper ribbon attachment on the float, and lower end of the ribbon is coupled to a lower ribbon attachment on the float.

In particular embodiments, which may combine the features of some or all above embodiments, the lower end of the ribbon incorporates a ribbon slack.

In particular embodiments, which may combine the features of some or all above embodiments, the ribbon slack comprises a loop.

In particular embodiments, which may combine the features of some or all above embodiments, the loop of the ribbon loops downward from the remaining ribbon.

In particular embodiments, which may combine the features of some or all above embodiments, the surface of the valve orifice that engages with the ribbon is oval or elliptical or racetrack shaped.

In particular embodiments, which may combine the features of some or all above embodiments, the ribbon interface of the inclined ramp of the float comprises a cavity.

In particular embodiments, which may combine the features of some or all above embodiments, the cavity of the ribbon interface corresponds to the shape of the valve orifice surface that engages with the ribbon.

In particular embodiments, which may combine the features of some or all above embodiments, the ribbon interface on the inclined ramp of the float comprises one or more ridges.

In particular embodiments, which may combine the features of some or all above embodiments, the ribbon interface on the inclined ramp of the float comprises one or more cutouts.

In particular embodiments, which may combine the features of some or all above embodiments, the ribbon is made of a fluoroelastomer.

In particular embodiments, which may combine the features of some or all above embodiments, the fluoroelastomer material of the ribbon is further reinforced with a polymer.

BRIEF DESCRIPTION OF THE DRAWINGS

The present invention will be described in greater detail below based on the exemplary figures. The invention is not limited to the exemplary embodiments. Other features and advantages of various embodiments of the present invention will become apparent by reading the following detailed description with reference to the attached drawings which illustrate the following.

DESCRIPTION OF EXAMPLE EMBODIMENTS

To facilitate a better understanding of the present disclosure, the following examples of certain embodiments are given. The following examples are not to be read to limit or define the scope of the disclosure. In accordance with various embodiments of the present disclosure, various mechanisms, assemblies, arrangements, and methods of assembly, manufacture, and/or operation of vent valves for fuel tank systems are disclosed herein.

Figure 1:
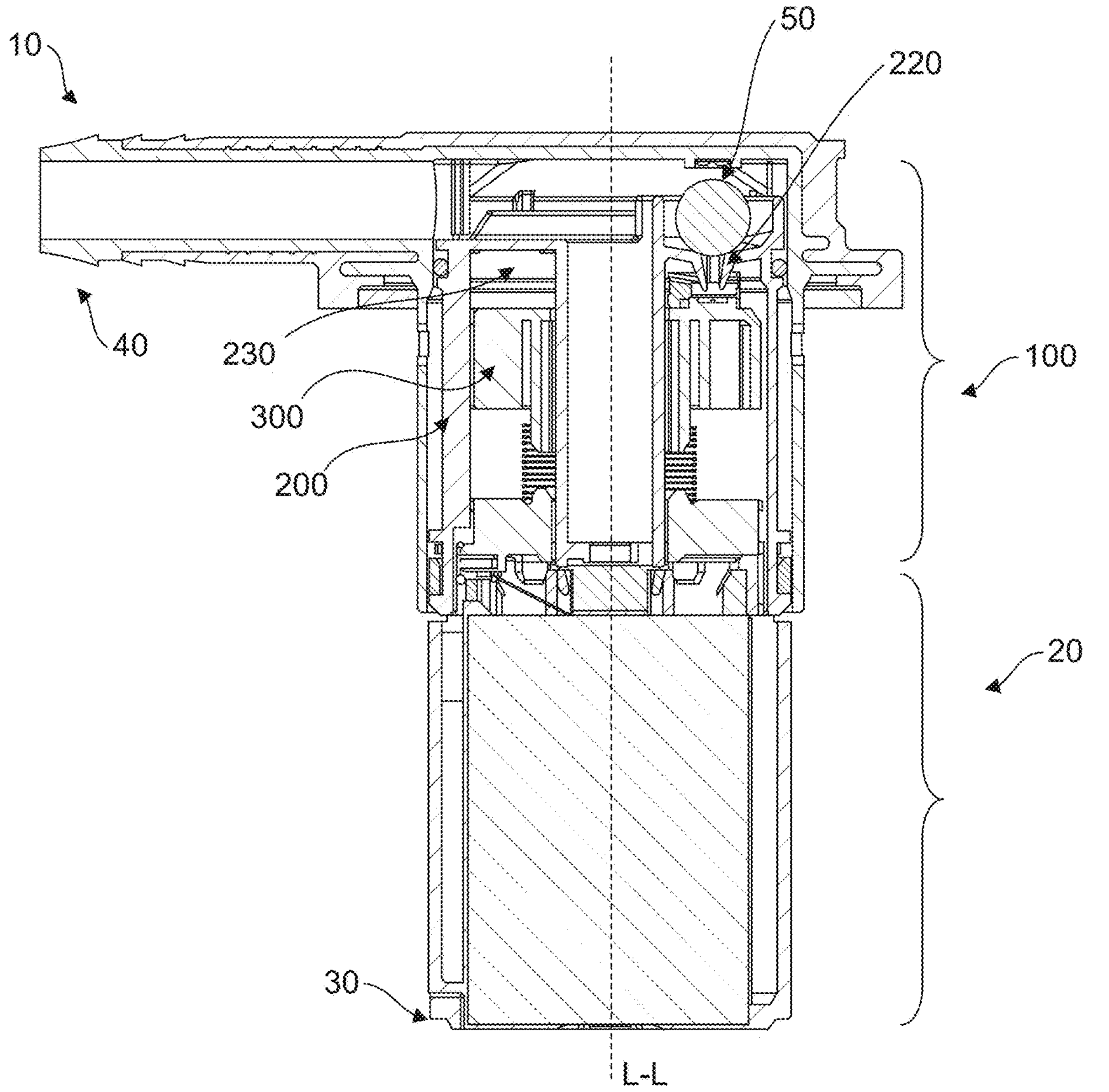
FIG. 1 is a schematic cross-sectional side view illustrating a valve assembly system, according to particular embodiments.

With reference to the figures, FIG. 1 is a schematic cross-sectional side view illustrating a valve assembly system, according to particular embodiments. In particular embodiments, a valve assembly system may comprise one or more valve assemblies. In particular embodiments, valve assembly system 10 may comprise a valve assembly 100. In particular embodiments, valve assembly system 10 may comprise a plurality of valve assemblies, such as valve assembly 20 and valve assembly 100. By way of example and not limitation, a valve assembly system may comprise a Compact Combo Valve. By way of example and not limitation, a valve assembly may comprise a Grade Vent Valve (GVV). By way of example and not limitation, a valve assembly may comprise a Fill Limit Valve (FLV).

In particular embodiments, a base 30 of valve assembly system 10 and/or valve assembly 100 may be fluidly connected to fluid contents of a tank, such as to a surface of liquid contents of a tank. In particular embodiments, the tank may be configured as a fuel tank. In particular embodiments, base 30 may permit fluid communication of the contents of the tank with valve assembly system 10 and/or valve assembly 100. In particular embodiments, valve assembly system 10 and/or valve assembly 100 may be provided with an outlet port 40. In particular embodiments, outlet port 40 may be located at top of the valve assembly system 10 and/or valve assembly 100, such as illustrated in FIG. 1 by way of non-limiting example. By way of example and not limitation, outlet port 40 may be an outlet conduit for fuel vapors released by the tank.

By way of illustration and not limitation, while this disclosure may describe details of a particular vent assembly (such as a Grade Vent Valve) in the context of an exemplary valve assembly 100, this disclosure fully contemplates any suitable valve assembly 100 based on the disclosed structures and/or functions. By way of example and not limitation, while internal structural details of a Fill Limit Valve, or any other suitable valve, are omitted here for purposes of clarity, it should be appreciated that a valve assembly 100 as disclosed herein may be deployed stand-alone, or in combination with other suitable valve assembly as part of a valve assembly system 10.

Figure 2:
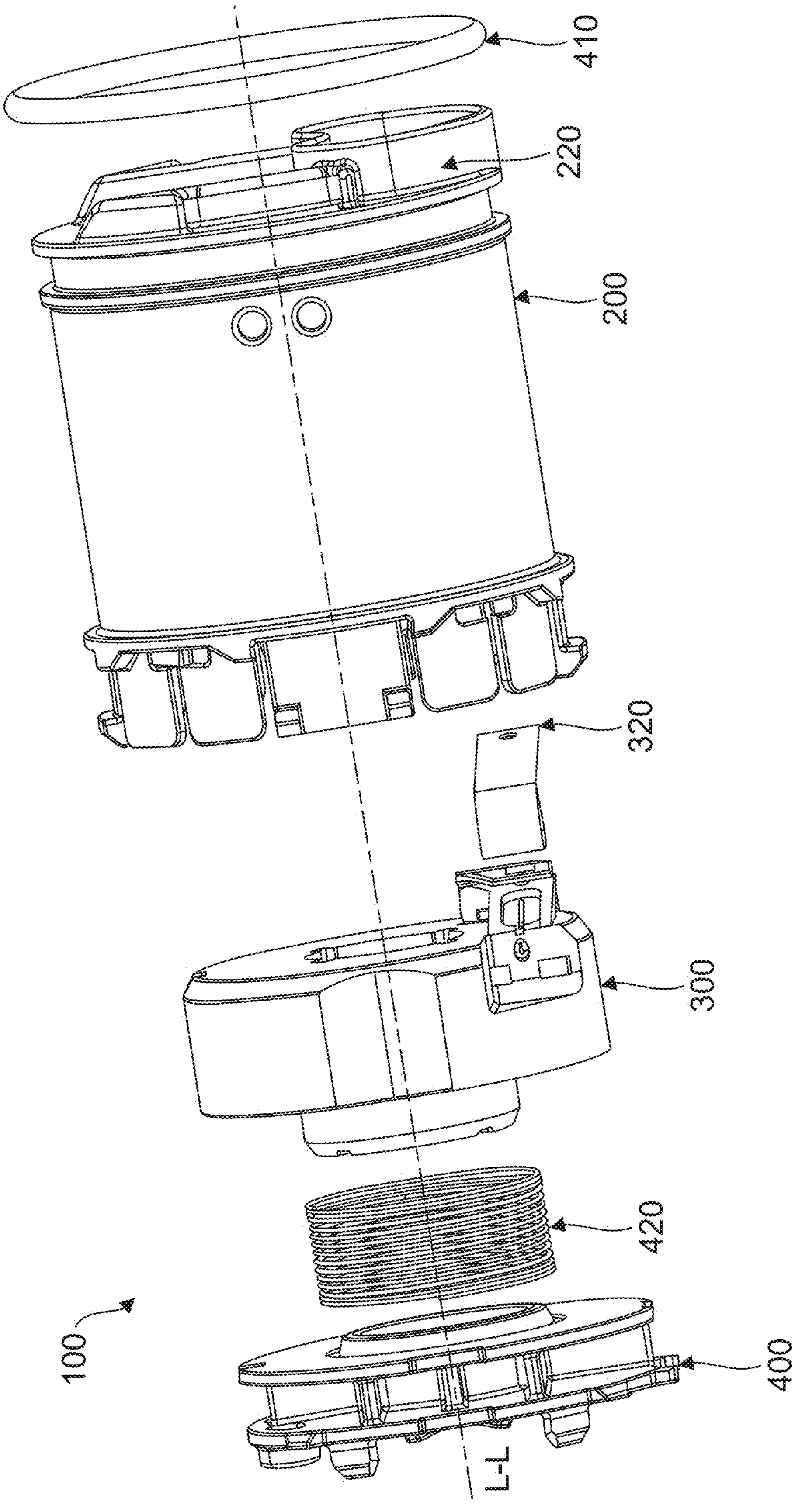
FIG. 2 is a schematic exploded view illustrating particular components of a valve assembly, according to particular embodiments.

FIG. 2 is a schematic exploded view illustrating particular components of a valve assembly, according to particular embodiments. In particular embodiments, valve assembly 100 may comprise a housing 200 having a longitudinal axis L-L. In particular embodiments, housing 200 may comprise a valve orifice 220 at one end of housing 200. In particular embodiments, housing 200 may enclose or contain an inner chamber 230. In particular embodiments, an upper surface of inner chamber 230 may be provided with vent orifice 220. In particular embodiments, valve orifice 220 may be in fluid communication with vent outlet port 40.

In particular embodiments, valve assembly 100 may comprise a float assembly 300. In particular embodiments, float assembly 300 may be movable along longitudinal axis L-L in particular embodiments. In particular embodiments, valve assembly 100 may comprise an end cap 400 on a base end of housing 200. In particular embodiments, an side of housing 200 opposite to a base end of housing 200 may comprise an upper side of housing 200. In particular embodiments, a connotation of "upper" in the context of this disclosure may align with a direction of travel opposite to a base end of housing 200 of movable float assembly 300 within housing 200. In particular embodiments, valve orifice 220 may be disposed at or proximal to an upper end of housing 200 and/or of valve assembly 100. In particular embodiments, valve assembly 100 may comprise one or more gaskets, O-Rings, seals, labyrinths and/or other suitable structures for scaling and/or containing fluid flow, such as O-Ring 410. In particular embodiments, valve assembly 100 may comprise one or more biasing members, such as spring 420. In particular embodiments, as will be further described herein, a membrane, such as a ribbon 320, may be installed on float assembly 300.

Figure 3A:
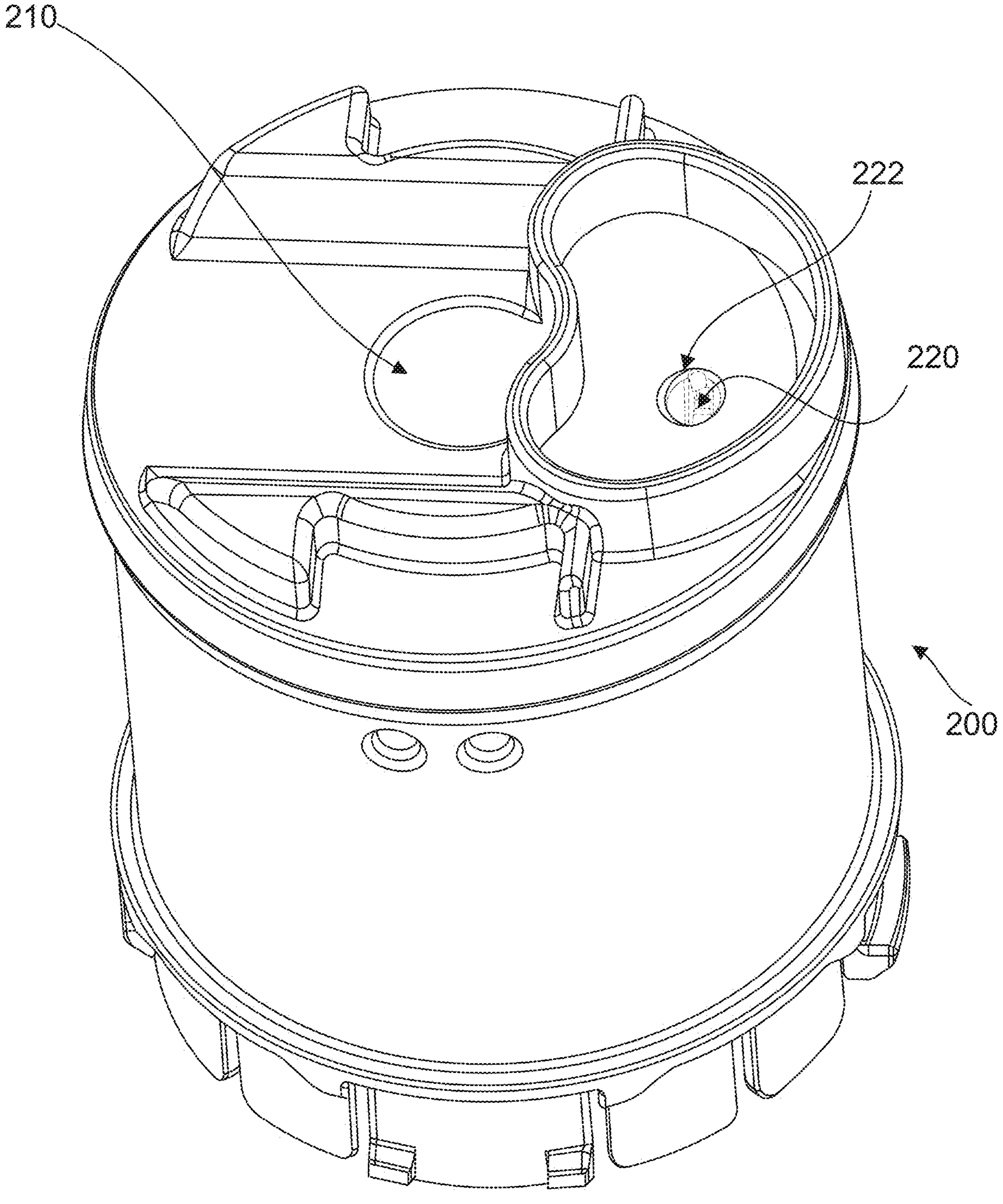
FIG. 3A is a schematic top perspective view of a valve assembly housing, according to particular embodiments.
Figure 3B:
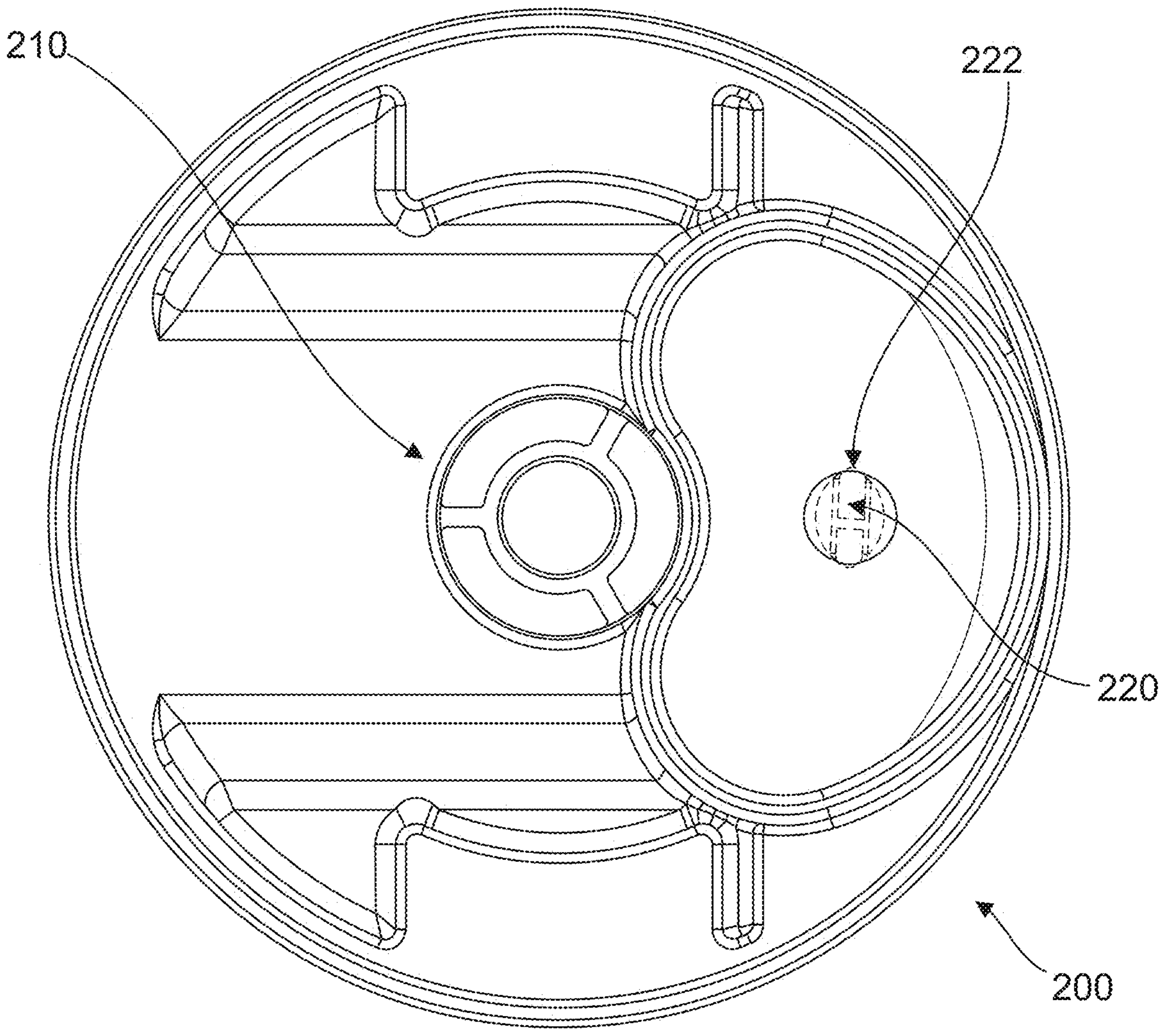
FIG. 3B is a schematic top view of a valve assembly housing, according to particular embodiments.
Figure 3C:
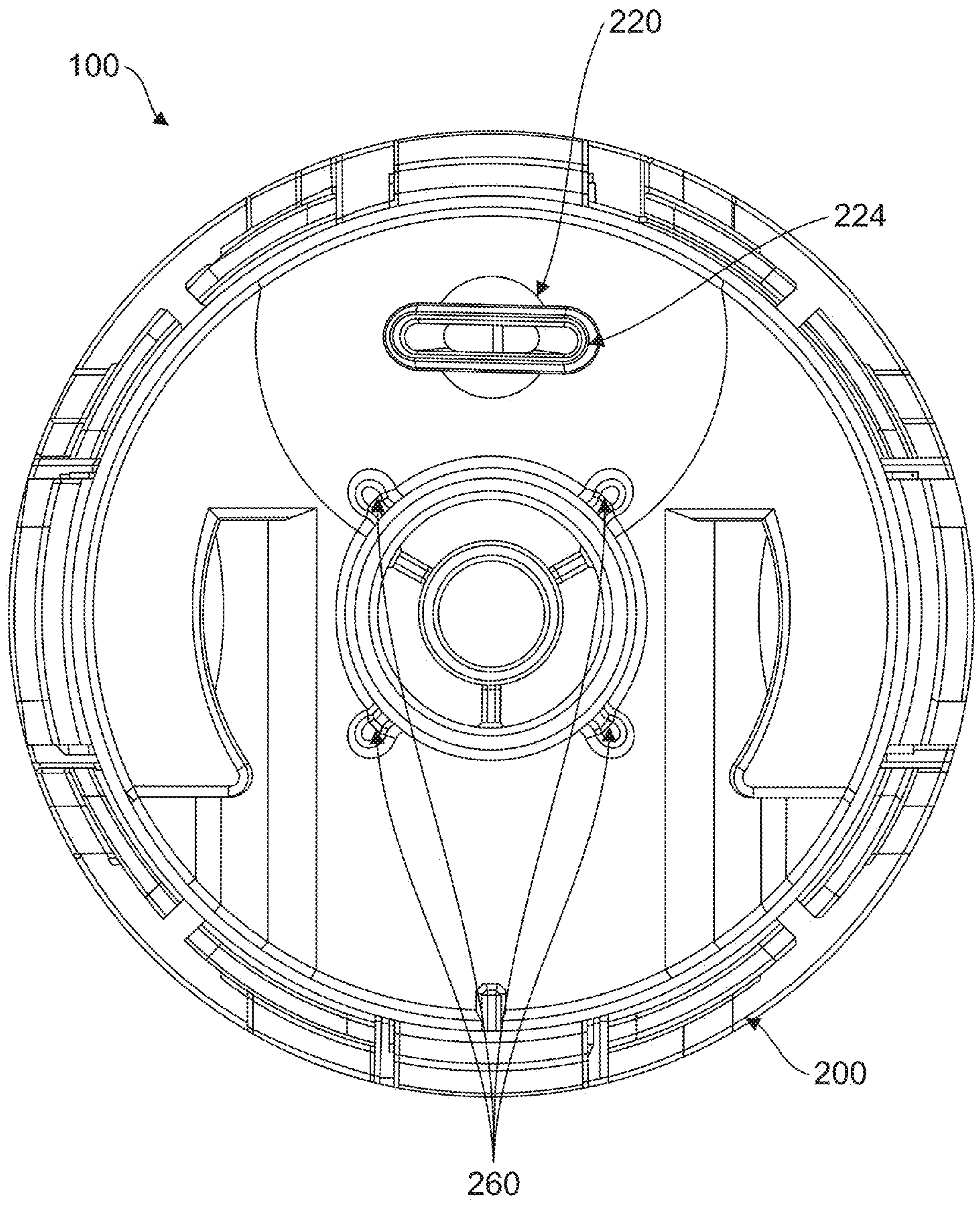
FIG. 3C is a schematic view of an upper surface of an inner chamber of a valve assembly housing, according to particular embodiments.

FIG. 3A is a schematic top perspective view of a valve assembly housing, according to particular embodiments. FIG. 3B is a schematic top view of a valve assembly housing, according to particular embodiments. FIG. 3C is a schematic view of an upper surface of an inner chamber of a valve assembly housing, according to particular embodiments.

In particular embodiments, an outer end 222 of valve orifice 220 on housing 200 may be have a circular or near-circular orifice form. In particular embodiments, a baffle or surrounding enclosure of valve orifice 220 on an outer surface of housing 200 may have a kidney-shaped form. In particular embodiments, valve orifice 220 on an outer surface of housing 200 may be configured to accommodate a valve, such as a ball valve or disc valve. By way of example and not limitation, FIG. 1 illustrates a ball valve 50 assembled at valve orifice 220 of valve assembly 100. In particular embodiments, an inner end 224 of valve orifice 220 on housing 200, such as viewed from within inner chamber 230 of housing 200, may have an elongated, oval, elliptical, and/or racetrack form.

In particular embodiments, a shape of outer end 222 of valve orifice 220 may be designed to facilitate effective coupling and interoperation with a valve mechanism previously discussed. In particular embodiments, a shape of inner end 224 of valve orifice 220 may be designed to facilitate effective coupling and interoperation with ribbon 320. In particular embodiments, valve orifice 220 provided within housing 200 may transition between different shapes of outer end 222 and inner end 224 within an upper section and/or along the longitudinal axis of housing 200. In particular embodiments, valve orifice 220 may transition from a substantially circular outer end 222 to an elongated inner end 224 within housing 200. In particular embodiments, valve orifice 220 may transition from a valve-facing opening on an upper surface of valve orifice 220 that is substantially circular or other suitable shape to a ribbon-facing opening on a lower surface of valve orifice 220 that is substantially elliptical, oval, racetrack-shaped, or other suitable shape. In particular embodiments, vent orifice 220 may comprise an elongated section aligned with a lengthwise axis of ribbon 320. In particular embodiments, a substantially circular and/or nearly circular shape may have a perimeter with at least one-half of its perimeter length or extent comprising a portion of a circle.

In particular embodiments, float assembly 300 may be slidably connected to housing 200, such as to be movable within housing 200 along longitudinal axis L-L. In particular embodiments, one or both of housing 200 and/or float assembly 300 may be provided with suitable structures for facilitating interconnection, constraint, and/or relative movement of float assembly 300 within housing 200. In particular embodiments, float assembly 300 and/or housing 200 may be provided with guides, guide rails, and/or guide channels. In particular embodiments, float assembly 300 may comprise a core, such as a central core, which may be hollow. In particular embodiments, such as described and illustrated herein by way of non-limiting example, such structures for facilitating interconnection, constraint, and/or relative movement of float assembly 300 within housing 200 may be provided at or proximal to an interfacing section associated with a central and/or inner core of float assembly 300. Additionally or alternatively, such structures for facilitating interconnection, constraint, and/or relative movement of float assembly 300 within housing 200 may be provided at or proximal to an outer peripheral interfacing portion. By way of example and not limitation, housing 200 may comprise one or more float guides 260. By way of example and not limitation, float assembly 300 may comprise one or more float guide channels 360. By way of example and not limitation, a central core 305 of float assembly 300 may be configured to slidably engage with a central core 210 of housing 200.

Figure 4:
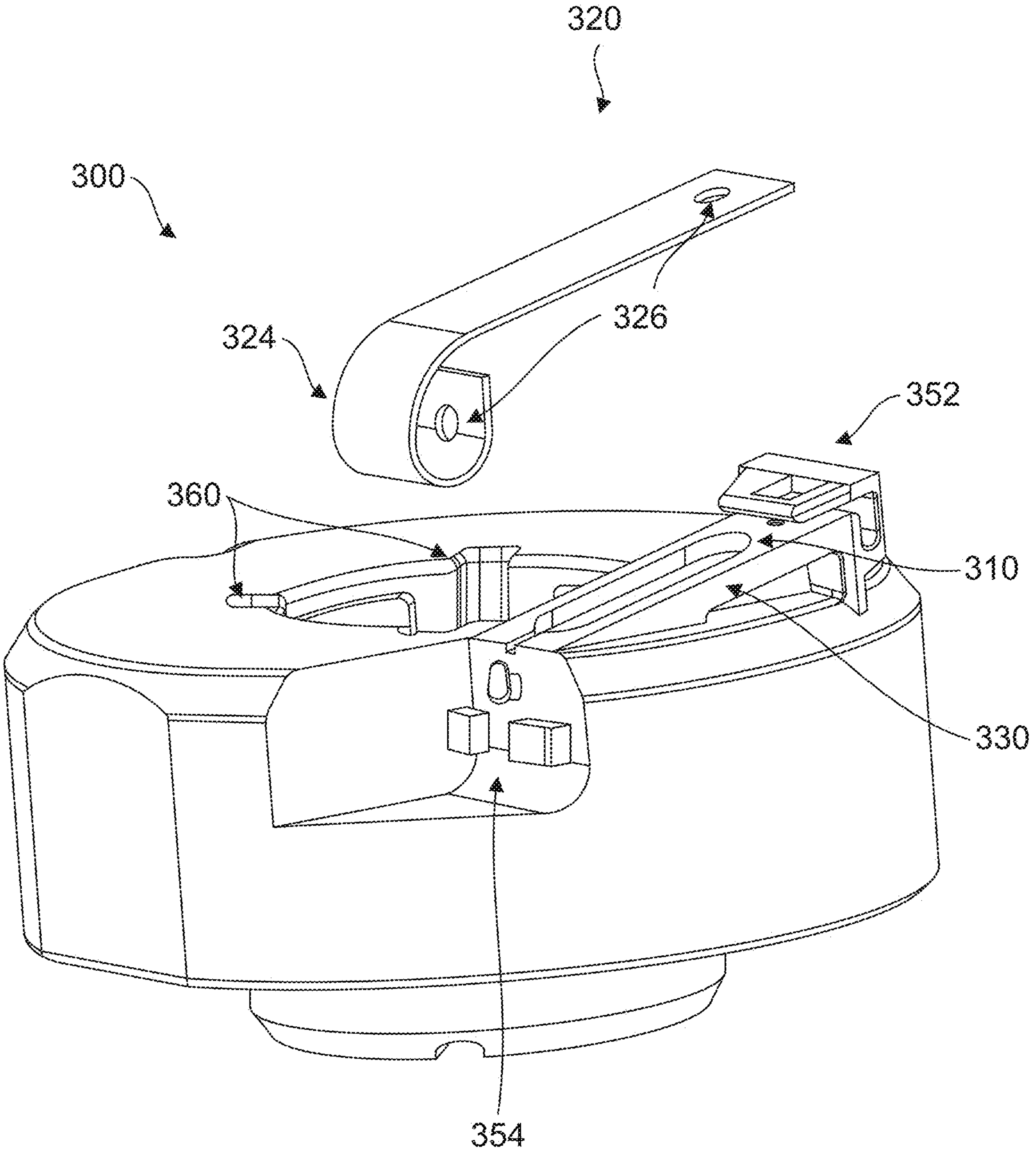
FIG. 4 is a schematic perspective view of a float assembly and a ribbon, according to particular embodiments.

FIG. 4 is a schematic perspective view of a float assembly and a ribbon, according to particular embodiments. In particular embodiments, float assembly 300 may be provided or located within housing 200 of valve assembly 100 such that float assembly 300 may translate along longitudinal axis L-L of housing 200 and valve assembly 100. By way of example and not limitation, float assembly 300 may translate or otherwise move within housing 200 in response to a level of liquid fuel in a tank, such as a fuel tank. In particular embodiments, respective materials of housing 200 and float assembly 300 may be selected so that their relative interface can have desired properties of low friction and/or appropriate clearance under a range of operating conditions.

Figure 7:
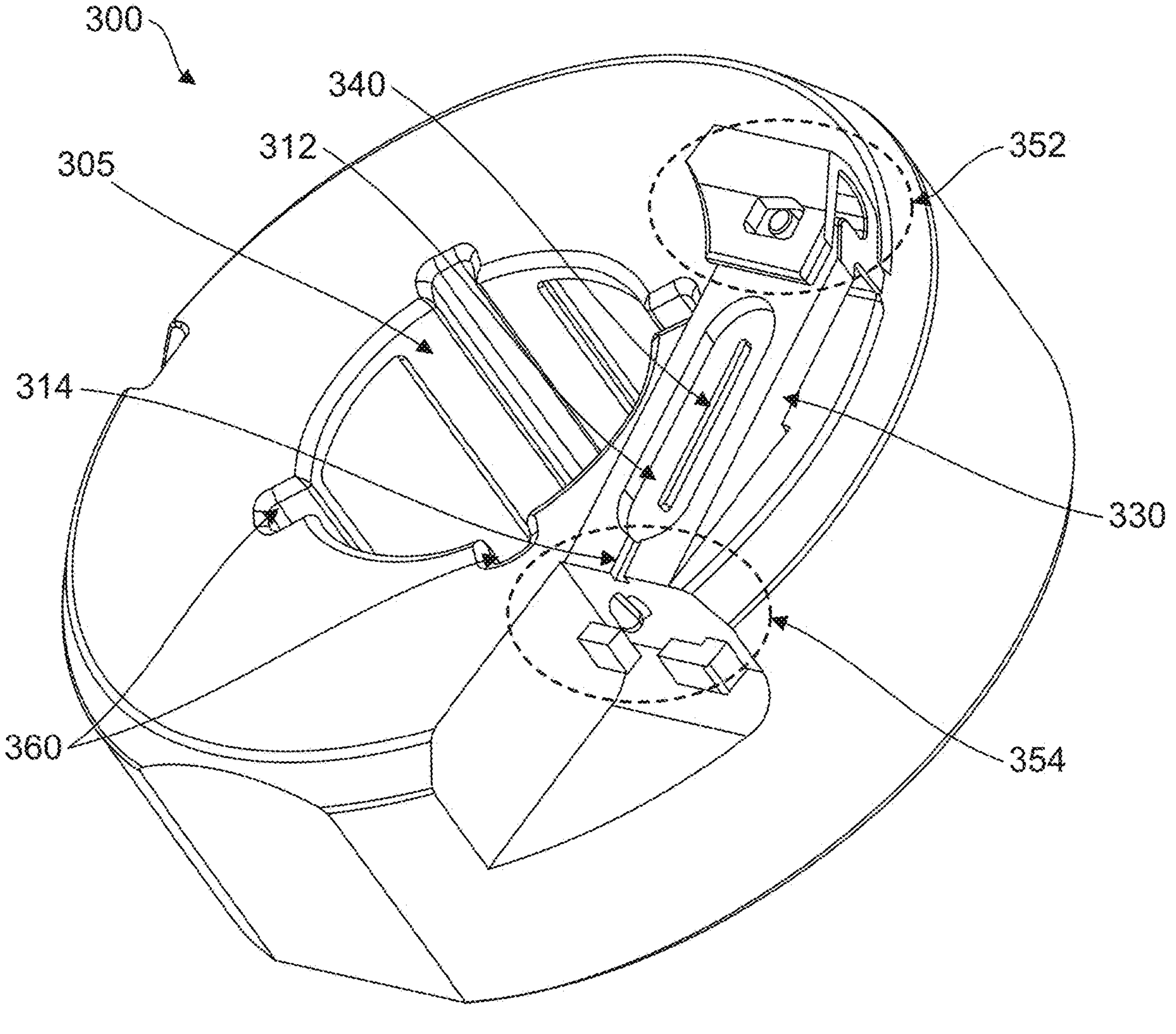
FIG. 7 is a schematic perspective top view of a float assembly with ribbon removed for illustration, according to particular embodiments.

In particular embodiments, while the longitudinal axis L-L of valve assembly 100 and/or housing 200 may be substantially vertical for a tank (such as a fuel tank of a vehicle) located on a horizontal surface, longitudinal axis L-L may not coincide with the vertical vector (i.e., parallel to the gravity vector) if the tank is located on an inclined or non-horizontal surface. As non-limiting examples, the longitudinal axis L-L of traversal of float assembly 300 may not be aligned with the vertical vector if a vehicle comprising the tank is parked on or traversing a gradient, or if the vehicle has rolled over. By way of example and not limitation, in such situations, float assembly 300 may remain constrained within housing 200. In particular embodiments, float assembly 300 may be guided by float guides such as one or more float guides 260 and/or one or more float guide channels 360 to translate along longitudinal axis L-L of housing 200, such as based on components of buoyant forces acting on float assembly 300. In particular embodiments, such as illustrated in FIGS. 3C, 7, and 9C by way of non-limiting example, float guides 260 may be located on housing 200 to engage with corresponding float guide channels 360 located on float assembly 300 for facilitating and selectively constraining a motion of float assembly 300 within housing 200.

Figure 5:
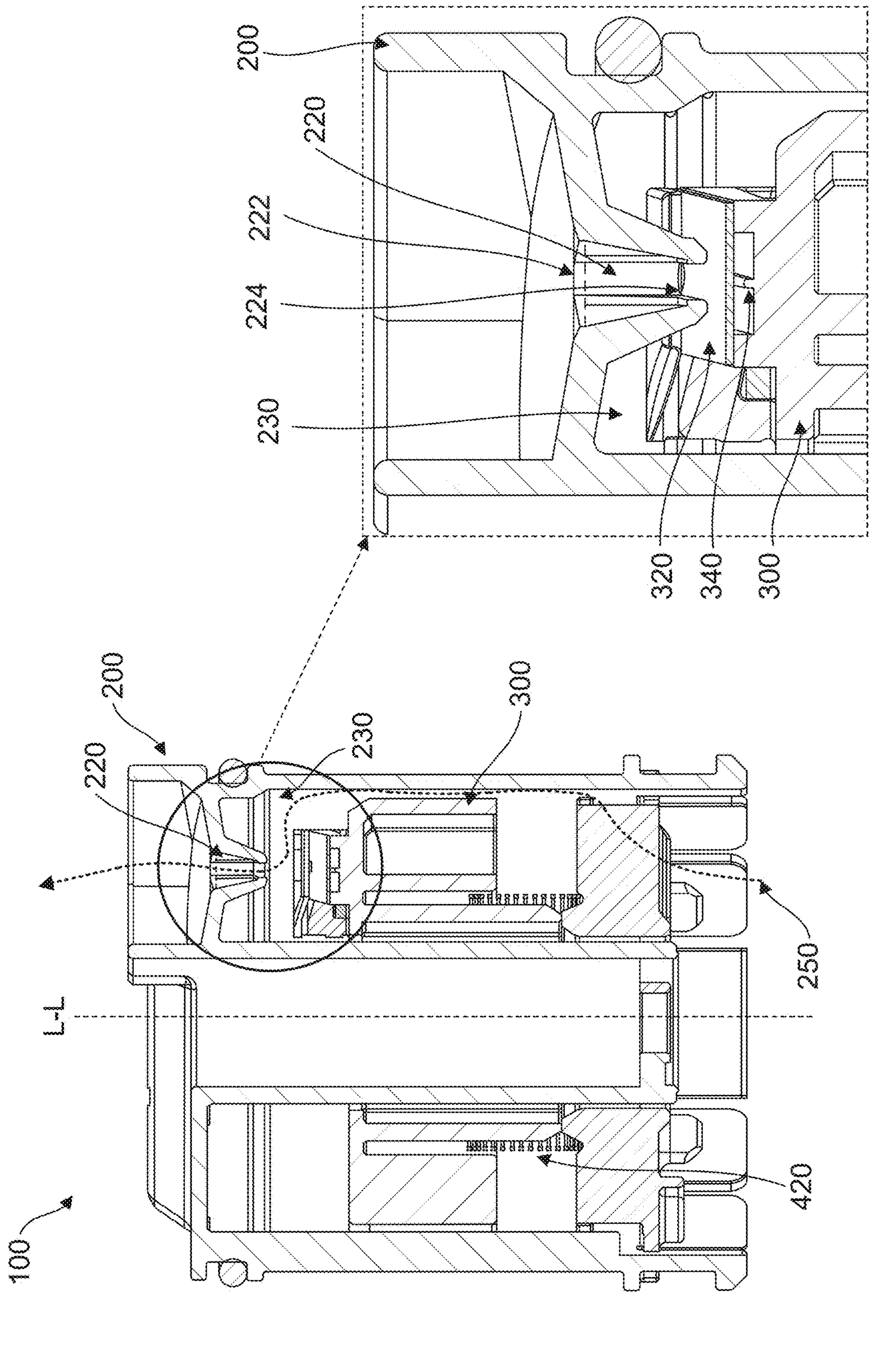
FIG. 5 is a schematic cross-sectional front view of a valve assembly, illustrating an overview and an enlarged inset view of the float assembly approaching an uppermost limit, according to particular embodiments.

FIG. 5 is a schematic cross-sectional front view of a valve assembly, illustrating an overview and an enlarged inset view of the float assembly approaching an uppermost limit, according to particular embodiments.

By way of example and not limitation, an approximate path 250 for release of fuel vapors from the tank through valve assembly 100 is also illustrated therein. By way of example and not limitation, while the position of float assembly 300 along longitudinal axis L-L may be determined by a liquid level (such as in a fuel tank), as discussed above, small clearances (e.g., a radial clearance along approximate path 250) may exist between float assembly 300 and housing 200 at their relative interface. By way of example and not limitation, fuel vapors from the tank may flow past float assembly 300 through such small clearances, and may occupy the volume above float assembly 300 within inner chamber 230 of housing 200. In particular embodiments, as previously discussed, a valve mechanism, such as a disk head valve or a ball valve, may be located at an outlet of valve orifice 220 in housing 200. In particular embodiments, such as valve mechanism may be designed and calibrated to open at a predetermined pressure level, such as to release fuel vapor buildup through outlet port 40. By way of example and not limitation, a disk valve or a ball valve may be designed to open at vapor pressures exceeding 5 kPa, to prevent pressure buildup beyond a designed opening pressure.

In particular embodiments, it may be desirable to close and seal valve orifice 220 against liquid leakage, such as of liquid fuel. As non-limiting examples, over-filling of liquid fuel, tilting of the fuel tank at a gradient, and/or a vehicle roll-over event may require valve orifice 220 to be sealed against liquid fuel leakage. Additionally, in particular embodiments, it may be desirable to promptly restore the functionality of the vapor release passage through valve orifice 220 following a sealing event of valve orifice 220. In particular embodiments, such restoration of fluid flow through valve orifice 220 may be provided by reopening valve orifice 220, for example, when a risk of liquid fuel leakage has abated. As a non-limiting example, following a reduction in the liquid fuel level back to a safe lower level, it can be desirable for valve orifice 220 to be available to release fuel vapors again.

In particular embodiments, a membrane, such as ribbon 320, may be provided for sealing the valve orifice. In particular embodiments, a membrane, such as ribbon 320, may be elongated along a lengthwise axis. In particular embodiments, a membrane, such as ribbon 320, may comprising a first end, a second end provided opposite the first end, and a slack portion associated with the second end. By way of example and not limitation, ribbon 320 may operate based on float assembly 300 rising and/or otherwise moving within float assembly 300 so that ribbon 320 abuts valve orifice 220 in housing 200. By way of continuing non-limiting example, ribbon 320, which may be provided for sealing valve orifice 220, may also be designed to effectively and/or promptly open ('unseal') and restore the opening to valve orifice 220 (e.g., inner end 224), and thereby restore normal fluid venting (e.g., fuel vapor venting) function. In some such embodiments, for instance, effective unsealing and/or reopening of ribbon 320 may rely upon equalizing fluid pressure differentials that may exist (e.g., across ribbon 320), and which differentials may hinder reopening ribbon 320. Therefore, in particular embodiments, an interaction between the design and features of ribbon 320, float assembly 300, and/or valve orifice 220 may control the efficacy and performance of sealing and reopening performance of valve assembly 100. Related structural and functional aspects are further discussed below.

According to specific embodiments, ribbon 320 may comprise a relatively flexible and durable member, membrane, or sheet, as required to reliably perform the above functions of effective sealing and prompt reopening. In particular embodiments, ribbon 320 may be relatively thin. As non-limiting examples, comprising ribbon 320 may comprise one or more materials including synthetic rubber, fluoropolymers, fluorosilicone, and/or silicone rubber, in particular embodiments. A base material of ribbon 320 may optionally be reinforced by additional materials, such as polyester or other polymers, in particular embodiments.

Figure 6:
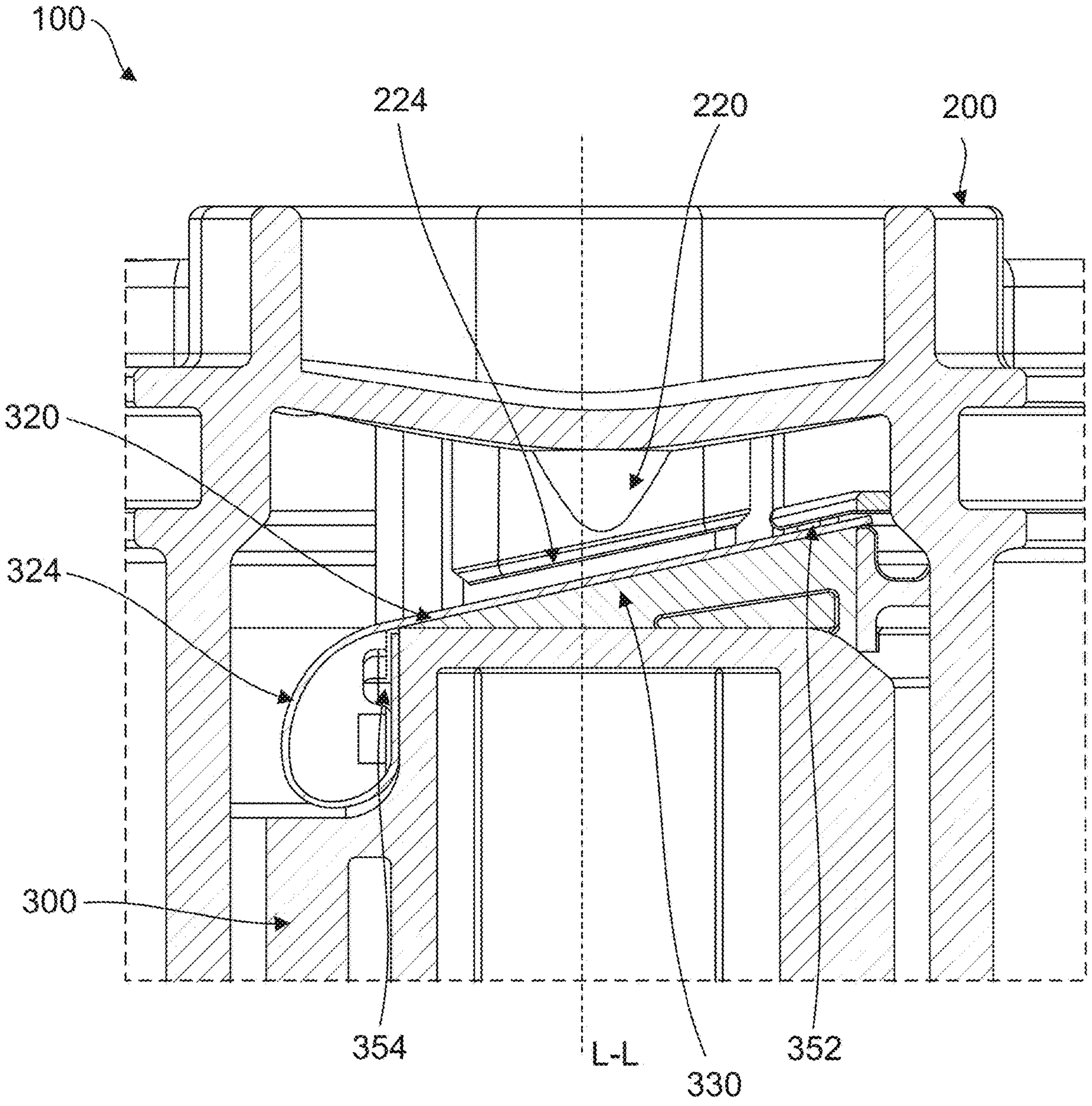
FIG. 6 is a schematic cross-sectional fragmentary side view of a valve assembly, according to particular embodiments.

FIG. 6 is a schematic cross-sectional fragmentary side view of a valve assembly, according to particular embodiments. In particular embodiments, a platform, such as ramp 330, may be provided on float assembly 300, such as on an upper surface of float assembly 300. In particular embodiments, ramp 330 may support ribbon 320 in a seated and/or sealing position of ribbon ribbon 320.

Figure 8:
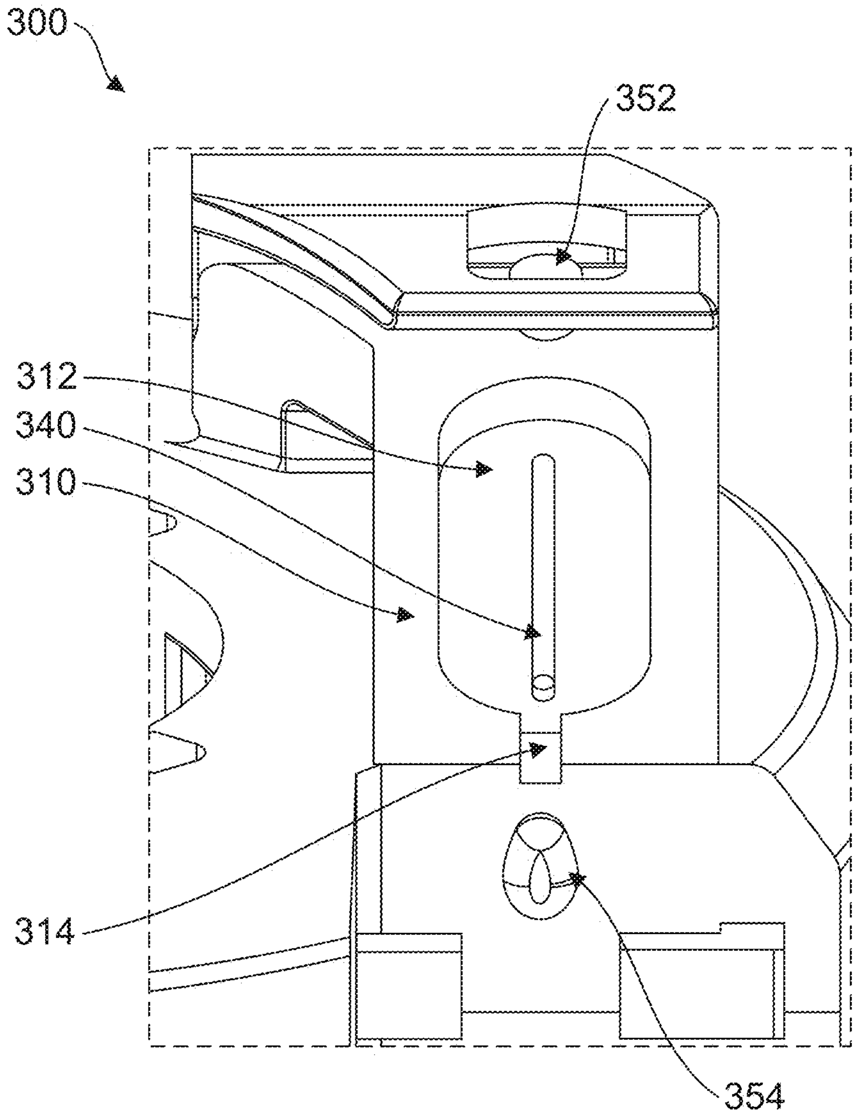
FIG. 8 is a schematic illustrating a fragmentary enlarged perspective front view of a float assembly with ribbon removed, according to particular embodiments.

FIG. 7 is a schematic perspective top view of a float assembly with ribbon removed for illustration, according to particular embodiments. FIG. 8 is a schematic illustrating a fragmentary enlarged perspective front view of a float assembly with ribbon removed, according to particular embodiments.

In particular embodiments, ribbon 320 may be coupled to float assembly 300 at one or more ribbon attachments provided on float assembly 300. Additionally or alternatively, external attachment structures, such as one or more fasteners and/or clips 356, may be used to couple one or more respective ends of ribbon 320 to float assembly 300 and/or housing 200.

By way of example and not limitation, the ends of ribbon 320 may be configured to be secured to two ribbon attachments on float assembly 300. According to specific embodiments (not shown), one or both of the ribbon attachment locations may be provided on the housing instead of the float. By way of example and not limitation, one or more ends of ribbon 320 may be provided with respective through-holes, such as through-holes 326, for securing ribbon 320 to ribbon attachments provided on float assembly 300 and/or to housing 200.

Figure 9A:
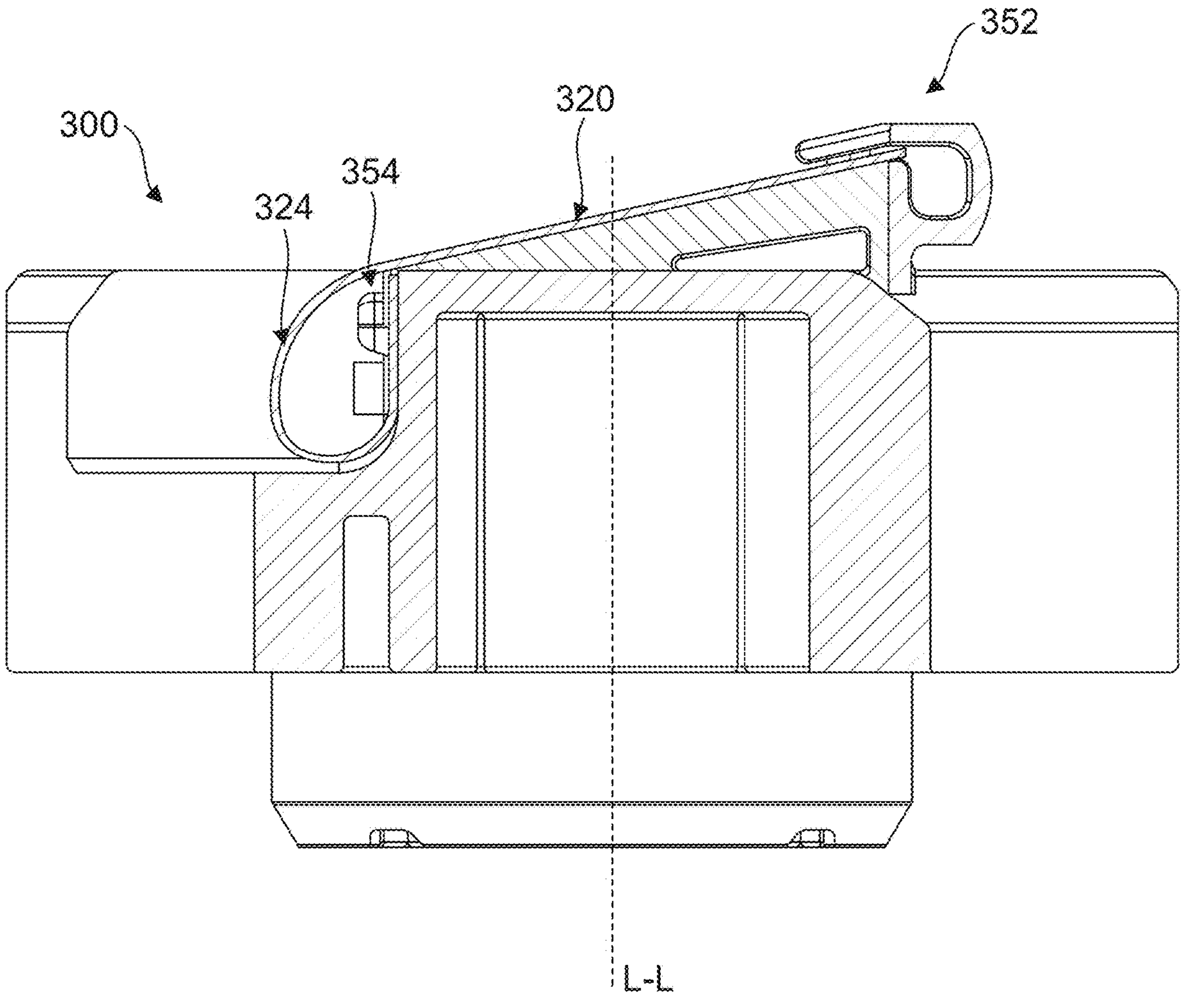
FIG. 9A is a schematic illustrating a cross-sectional side view of a float assembly with ribbon installed, according to particular embodiments.
Figure 9B:
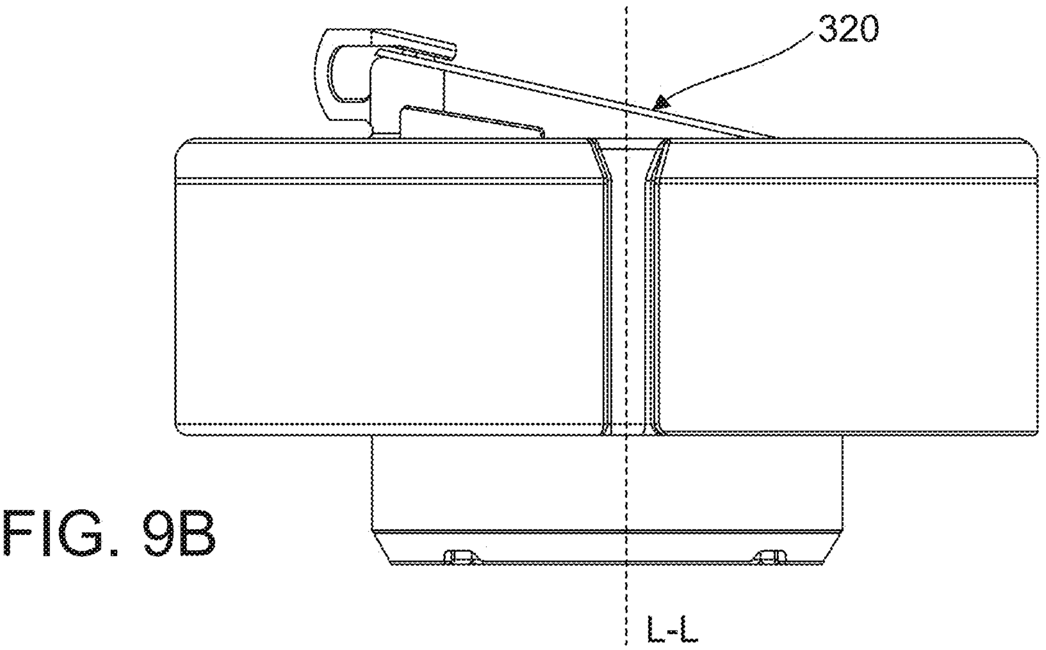
FIG. 9B is a schematic illustrating a side view of a float assembly with ribbon installed, according to particular embodiments.
Figure 9C:
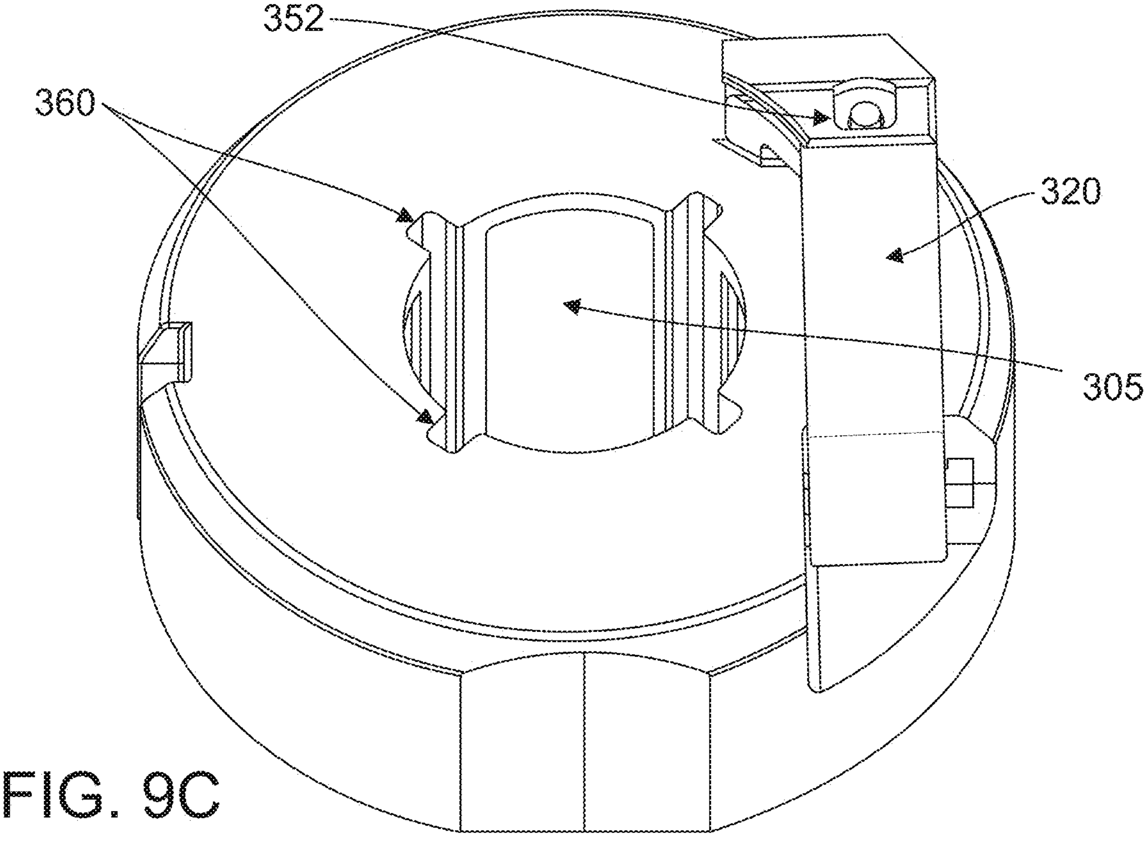
FIG. 9C is a schematic illustrating a perspective front view of a float assembly with ribbon installed, according to particular embodiments.

FIGS. 9A-9C schematically illustrate a float assembly with ribbon installed, according to particular embodiments. In particular embodiments, as illustrated in FIGS. 7 and 9 by way of non-limiting example, float assembly 300 may comprise a first ribbon attachment 352 and/or a second ribbon attachment 354. In particular embodiments, first ribbon attachment 352 may be offset from second ribbon attachment 354 along the longitudinal axis L-L. In particular embodiments, relative to second ribbon attachment 354, first ribbon attachment 352 may be offset toward the upper surface of the inner chamber 230 and/or housing 200.

Figure 10A:
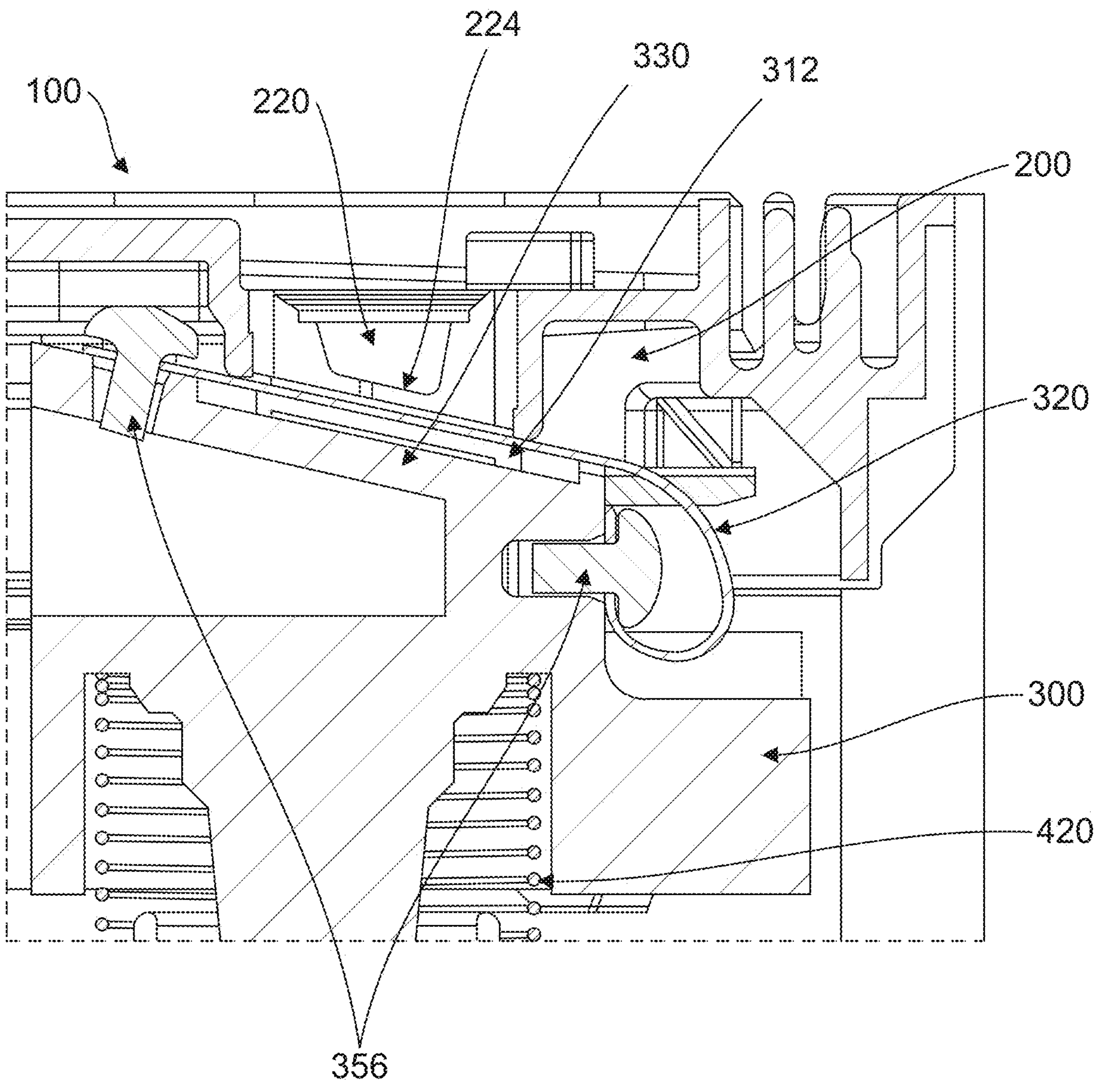
FIG. 10A is a schematic illustrating a cross-sectional side view of a float assembly with ribbon installed, according to particular embodiments.

In particular embodiments, such as illustrated in FIGS. 6 and 10A, an interfacing portion of valve orifice valve orifice 220 (e.g., inner end 224) located on housing 200 may interface and engage with ribbon ribbon 320 when valve orifice 220 is sealed by ribbon 320. In particular embodiments, such (e.g., inner end 224) an interfacing portion of valve orifice 220 may also be inclined or sloped. By way of example and not limitation, inner end 224 of valve orifice 220, ribbon 320, and/or ramp 330 may be angled or inclined such that in a sealed configuration, some or all of them may be mutually aligned. In particular embodiments, such mutual alignment can be configured such that ribbon 320 may be sandwiched and/or otherwise closely held in an angled, inclined, and/or sloped orientation between a corresponding angled surface of valve orifice 220 and/or the angled ramp 330 on float assembly 300.

In particular embodiments, ramp 330 is angled relative to a plane that is orthogonal to the longitudinal axis L-L. In particular embodiments, ramp 330 is so angled to a plane that is orthogonal to the longitudinal axis L-L at an angle between five degrees and thirty degrees. In particular embodiments, ramp 330 is so angled to a plane that is orthogonal to the longitudinal axis L-L at an angle between ten degrees and fifteen degrees.

Figure 10B:
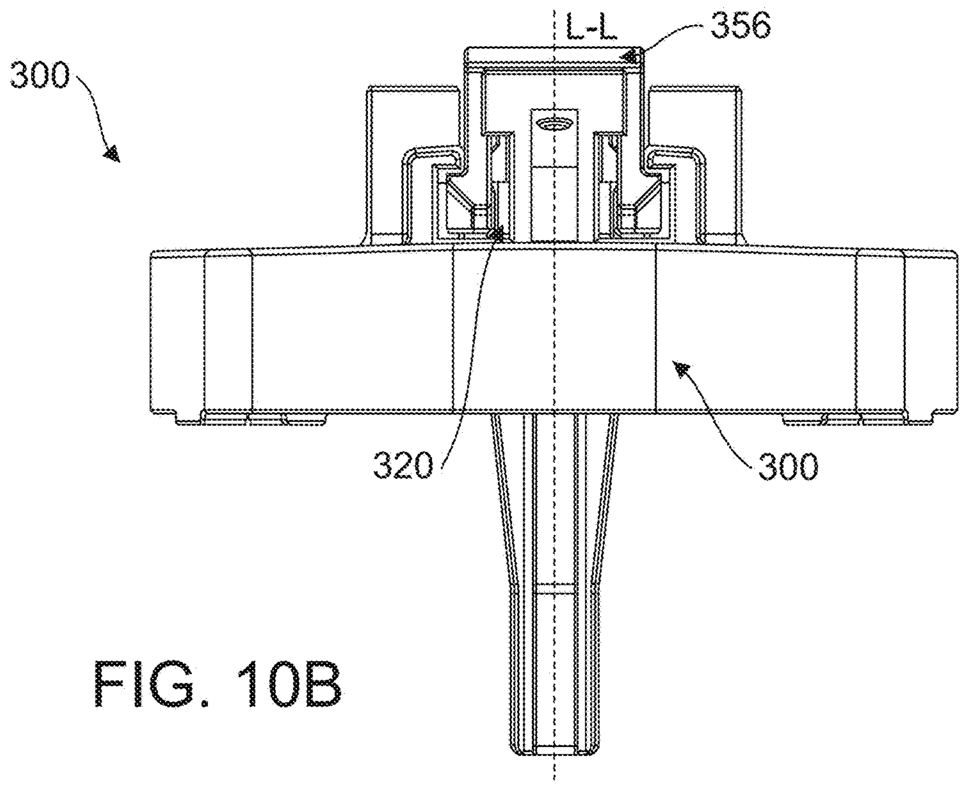
FIG. 10B is a schematic illustrating a rear view of a float assembly with ribbon installed, according to particular embodiments.
Figure 10C:
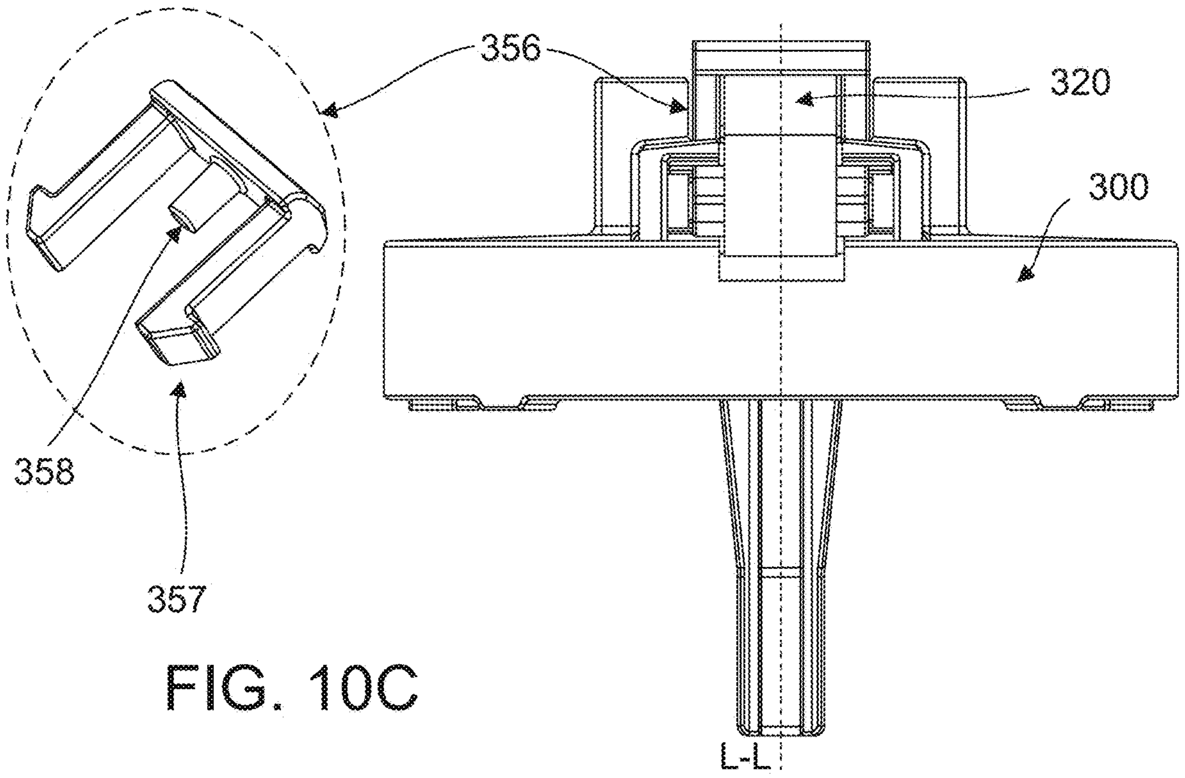
FIG. 10C is a schematic illustrating a front view of a float assembly with ribbon installed, with an inset showing a perspective view of a ribbon attachment clip, according to particular embodiments.

FIG. 10A is a schematic illustrating a cross-sectional side view of a float assembly with ribbon installed, according to particular embodiments. FIG. 10B is a schematic illustrating a rear view of a float assembly with ribbon installed, according to particular embodiments. FIG. 10C is a schematic illustrating a front view of a float assembly with ribbon installed, with an inset showing a perspective view of a ribbon attachment clip, according to particular embodiments.

In particular embodiments, as illustrated by way of non-limiting example in at least FIGS. 6, 9A, 10A, and 11A, a first end of ribbon 320 may be coupled or otherwise secured to first ribbon attachment 352 so as to be held relatively taut or stretched at that location. In particular embodiments, ribbon 320 may comprise a portion having ribbon slack 324 at or proximal to a second end of ribbon 320 opposite the first end of ribbon 320. In particular embodiments, the second end of ribbon 320 may be coupled or otherwise secured to second ribbon attachment 354 so that ribbon slack 324 is disposed at or proximal to second ribbon attachment 354.

In particular embodiments, at least a portion of ribbon slack 324 may be disposed at or proximal to a ribbon attachment, such as second ribbon attachment 354, as a curvature and/or loop of available ribbon length. In particular embodiments, such as illustrated in FIGS. 6, 9A, 11A, and 12 by way of non-limiting example, the loop or curvature associated with ribbon slack 324 may curl or spiral downward, or away from valve orifice 220, from the primary or remaining extent of the ribbon prior to coupling to second ribbon attachment 354. In particular embodiments, the loop may curl upward, and/or toward valve orifice 220, from the primary or remaining extent of the ribbon (not shown here) prior to coupling to second ribbon attachment 354.

As illustrated by way of non-limiting example in at least FIGS. 7 and 8, in particular embodiments, ramp 330 on float assembly 300 may be provided with a ribbon interface 310 for supporting ribbon 320 in a seated and/or sealing position of ribbon 320. By way of example and not limitation, ribbon interface 310 may be provided with a form or shape corresponding to the ribbon-facing opening shape (e.g, inner end 224) of valve orifice 220. In particular embodiments, ribbon interface 310 on float assembly 300 may comprise a cavity 312. In particular embodiments, one or more protruding ridges, such as ridge 340, may be provided within or proximal to ribbon interface 310. By way of example and not limitation, ridge 340 may provide rigidity to ribbon 320 during an event comprising ribbon 320 seating on ramp 330 and/or sealing valve orifice 220. In particular embodiments, ridge 340 may accordingly facilitate preventing wrinkling, flopping, folding, and/or misalignment of ribbon 320, such as relative to ribbon interface 310, based on the desired configurations and interfacing surfaces of ribbon 320. By way of example and not limitation, ridge 340 may facilitate supporting and/or holding ribbon 320 in alignment with valve orifice 220, when valve orifice 220 is sealed by ribbon 320, to prevent fluid leakage through valve orifice 220, wherein ribbon 320 may be sandwiched or suitably held between the valve orifice 220 and ribbon interface 310. By way of example and not limitation, a central ridge 340 corresponding to the above description is illustrated in at least FIGS. 7 and 8. In particular embodiments, ridge 340 may be oriented along a lengthwise direction and/or axis of ribbon 320, and/or of ramp 330, and/or of inner end 224 of valve orifice 220.

As discussed, in particular embodiments, a function of ribbon 320 may be to cover and/or otherwise seal a vapor release passage through valve orifice 220. By way of example and not limitation, ribbon 320 may be configured to seal valve orifice 220 when a liquid fuel level has caused float assembly 300 to move to an uppermost limit of float assembly 300, so as to prevent unintended leakage of liquid fuel through valve orifice 220. By way of example and not limitation, in operation float assembly 300 may rise responsive to the rising level of liquid fuel so that the upper surface of ribbon 320 can engage with inner end 224 of valve orifice 220 located in housing 200. By way of example and not limitation, FIG. 6 illustrates float assembly 300 with installed ribbon 320 approaching an uppermost extent of travel available to float assembly 300, with an upper surface of ribbon 320 about to be seated and sealing valve orifice 220 closed based on an incremental upward motion of float assembly 300 along longitudinal axis L-L to its uppermost position.

In particular embodiments, relatively to more rigid, hard, and/or stiff materials, a relatively flexible and deformable form and/or material of a membrane (e.g, ribbon 320) may further compress to provide improved sealing around inner end 224 of valve orifice 220 as float assembly 300 moves to its uppermost extent along L-L.

As has been additionally discussed, in particular embodiments, ribbon 320 may be designed to promptly restore the fluid flow functionality of valve orifice 220, such as for fuel vapor release, and such as when a liquid fuel level may have decreased so that float assembly 300 may travel below a former uppermost extent or limit. In particular embodiments, in such non-limiting scenarios, it may be desirable for a longitudinal motion of float assembly 300 to closely and promptly track the now-decreasing level of liquid (e.g., liquid fuel), thereby effectively and promptly uncovering valve orifice 220 (e.g, vapor release valve passage, so as to restore the ability to release unwanted fuel vapors). However, in the absence of specific features contemplated and disclosed herein, float assembly 300 may not readily withdraw away from an uppermost extent (e.g., downward) based on a decrease in liquid level (e.g., liquid fuel level in the tank). By way of example and not limitation, this form of potential difficulty or recalcitrance in a downward motion of float assembly 300 may occur in particular cases and embodiments because an instantaneous fluid pressure in an inner chamber 230 of housing 200 located above float assembly 300 may tend to decrease based on incipient volume enlargement of inner chamber 230. Accordingly, by way of continuing non-limiting example, the corresponding reduction in pressure above float assembly 300 may prevent float assembly 300 from moving away from its uppermost extent (e.g., down) based on the relative pressure differential formed across (i.e., between above and below) the upper surface of float assembly 300. Separately or additionally, relative pressure conditions in the valve orifice 220 (e.g., in the fuel vapor release passage) may tend to hold ribbon 320 closed following an initial closing and sealing event of ribbon 320 against valve orifice 220. In such situations, for example, it may be desirable to specifically design ribbon 320 to deliberately (i.e., by design) and promptly reopen to equalize the pressure above and below ribbon 320, and/or across float assembly 300, so as to permit float assembly 300 to move in tandem with the liquid level decrease, thereby uncovering valve orifice 220 and the corresponding vapor release passage.

In particular embodiments, based on a seated and/or sealed position of ribbon 320, the lower surface of ribbon 320 may fully rest on the angled ramp 330 of float assembly 300. In particular embodiments, separately or additionally, the upper surface of ribbon 320 may be held sealed against the similarly angled or inclined inner end 224 of valve orifice 220. In particular embodiments, air relief or other gas relief in cavity 312 located in ribbon interface 310 of ramp 330, such as illustrated in at least FIGS. 7 and 8, may permit ribbon 320 to better conform against ribbon interface 310 and/or valve orifice 220, such as for tighter seating and/or sealing. In particular embodiments, one or more ridges, such as ridge 340, may support ribbon 320 from collapsing, such as into cavity 312 of ribbon interface 310. In particular embodiments, cavity 312 may comprise an elongated section aligned with a lengthwise direction or axis of ramp 330, and/or of ribbon 320.

In particular embodiments, a first end of ribbon 320 may be associated with an upper attachment (e.g., first ribbon attachment 352). In particular embodiments, a second end of ribbon 320 may be associated with a lower attachment (e.g., second ribbon attachment 354). Additionally, in particular embodiments, a second end of ribbon 320 may be provided with ribbon slack 324. In particular embodiments, ribbon slack 324 may spiral or loop (upward or downward) along an axis perpendicular to a lengthwise axis of an elongated extent of ribbon 320.

In particular embodiments, when a liquid level associated with valve assembly 100, such as a fuel tank liquid level, initially decreases below a level corresponding to an uppermost extent of float assembly 300, a resultant force (e.g., a downward force, and/or a force oriented away from an uppermost extent) acting on float assembly 300 may act on ribbon 320 first at the relatively taut first end of ribbon 320 secured at first ribbon attachment 352. In particular embodiments, ribbon slack 324 provided at or proximal to the relatively lower ribbon attachment (e.g., second ribbon attachment 354) can prevent the resultant force from being initially experienced by ribbon 320 at the second end of ribbon 320. As a result, in particular embodiments, the first (upper) end of the inclined and seated ribbon 320 may be effectively and promptly withdrawn from valve orifice 220 by the resultant peel-away action or effect, thereby rapidly neutralizing any pressure differentials that may have otherwise prevented an effective movement (e.g., downward translation) of float assembly 300 away from its uppermost extent, along the longitudinal axis L-L of motion. In particular embodiments, as motion of float assembly 300 away from the uppermost extent continues, the second (lower) end of the ribbon may temporarily lose some of the slack represented in its ribbon slack 324 as ribbon 320 may temporarily lift off above ramp 330 of float assembly 300.

In particular embodiments, while ribbon slack 324 may facilitate prompt and effective reopening of valve orifice 220, as discussed above, providing ribbon slack 324 at the second end of ribbon 320 configured as one or more suitably formed ribbon loops may also, in particular embodiments, provide additional or alternative benefits related to sealing valve orifice 220 by ribbon 320. By way of example and not limitation, based on the disclosed form and/or material of ribbon 320, and the form of one or more loops, a ribbon slack portion 324 may act as a spring in tension to stiffen ribbon 320 as ribbon 320 is raised off the inclined ramp 330 of float assembly 300, thereby preventing wrinkling, flopping, folding, or other undesired deformation or misalignment of float assembly 300. By way of example and not limitation, high fluid flow rates in the vicinity of ribbon 320 may produce significant pressures and/or forces based on their interactions and/or dynamics, which may displace, misalign, and/or otherwise hinder effective location of ribbon 320 relative to valve orifice 220. In particular embodiments, the abovementioned beneficial aspects of the ribbon slack 324, including but not limited to the form of one or more loops, can therefore provide rigidity to ribbon 320. In particular embodiments, the abovementioned beneficial aspects of the ribbon slack 324 can facilitate the ability to constrain and/or present ribbon 320 to valve orifice 220 in a flat and aligned manner, thereby improving scaling performance of ribbon 320 relative to valve orifice 220.

In particular embodiments, one or more channels, grooves, and/or cutouts, such as cutout 314, may be provided at ribbon interface 310. By way of example and not limitation, cutout 314 may prevent air and/or other gases from being trapped in cavity 312 of ribbon interface 310. As a non-limiting example, an absence of cutout 314 may be associated with a suction or vacuum forming in ribbon interface cavity 312 under a seated ribbon 320, thereby potentially hindering a prompt and/or effective peeling away of ribbon 320 when re-opening of a sealed configuration is desired.

Figure 11A:
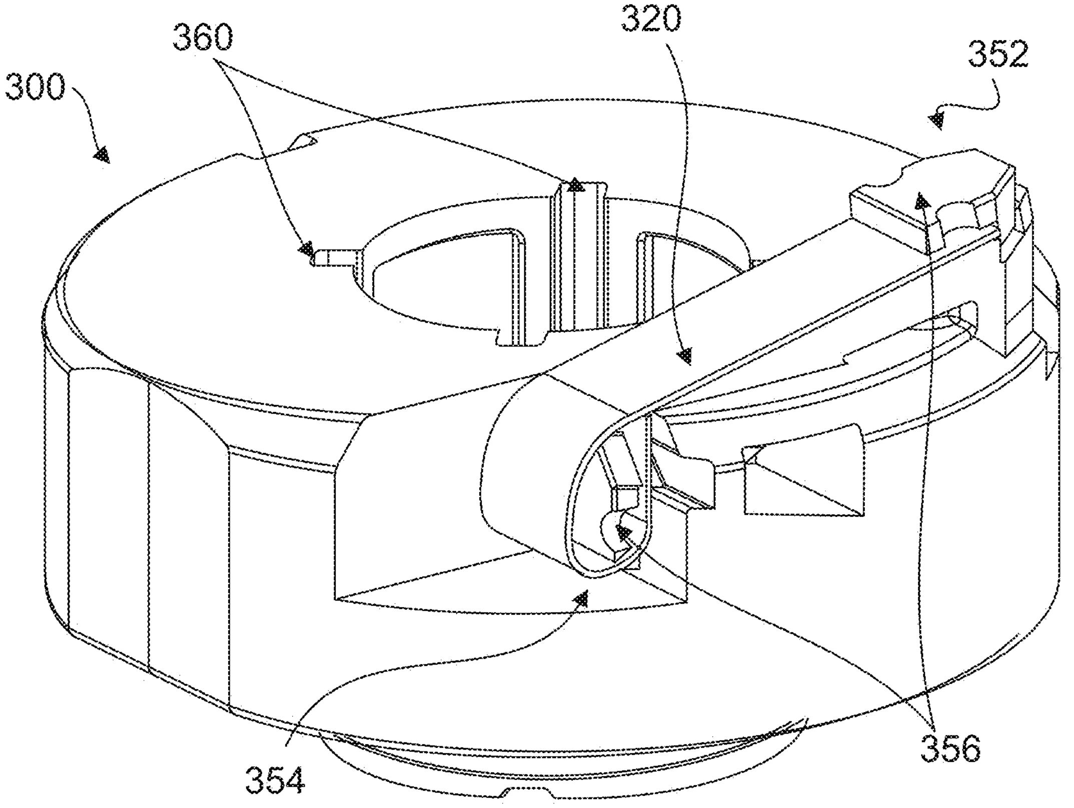
FIG. 11A is a schematic illustrating a perspective view of a float assembly with ribbon installed, according to particular embodiments.
Figure 11B:
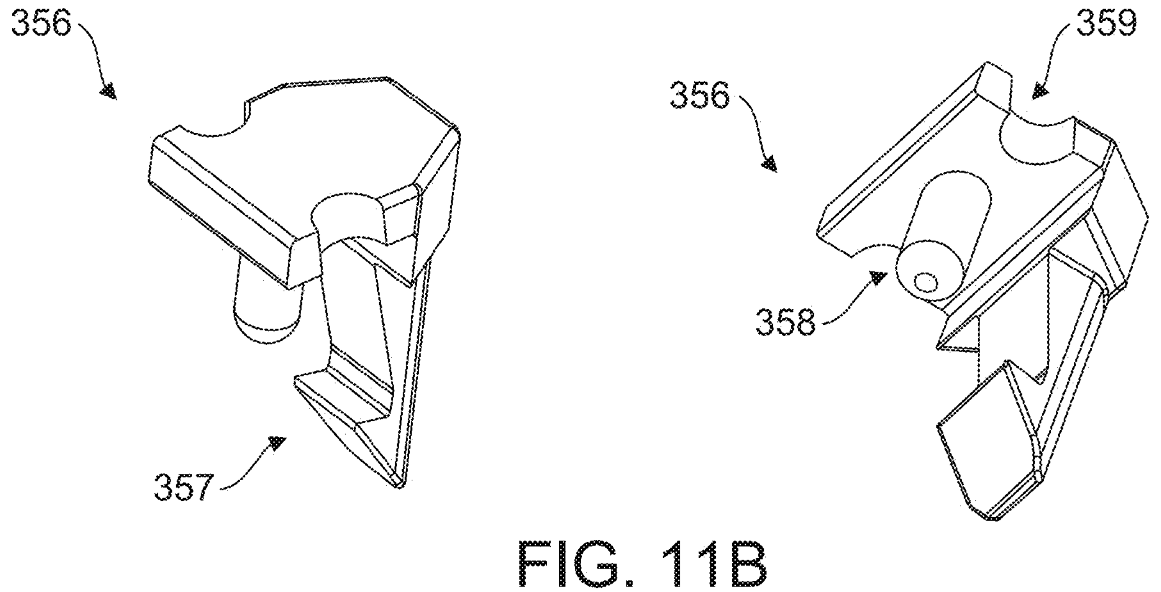
FIG. 11B comprises schematic perspective views of a ribbon attachment clip, according to particular embodiments.
Figure 12:
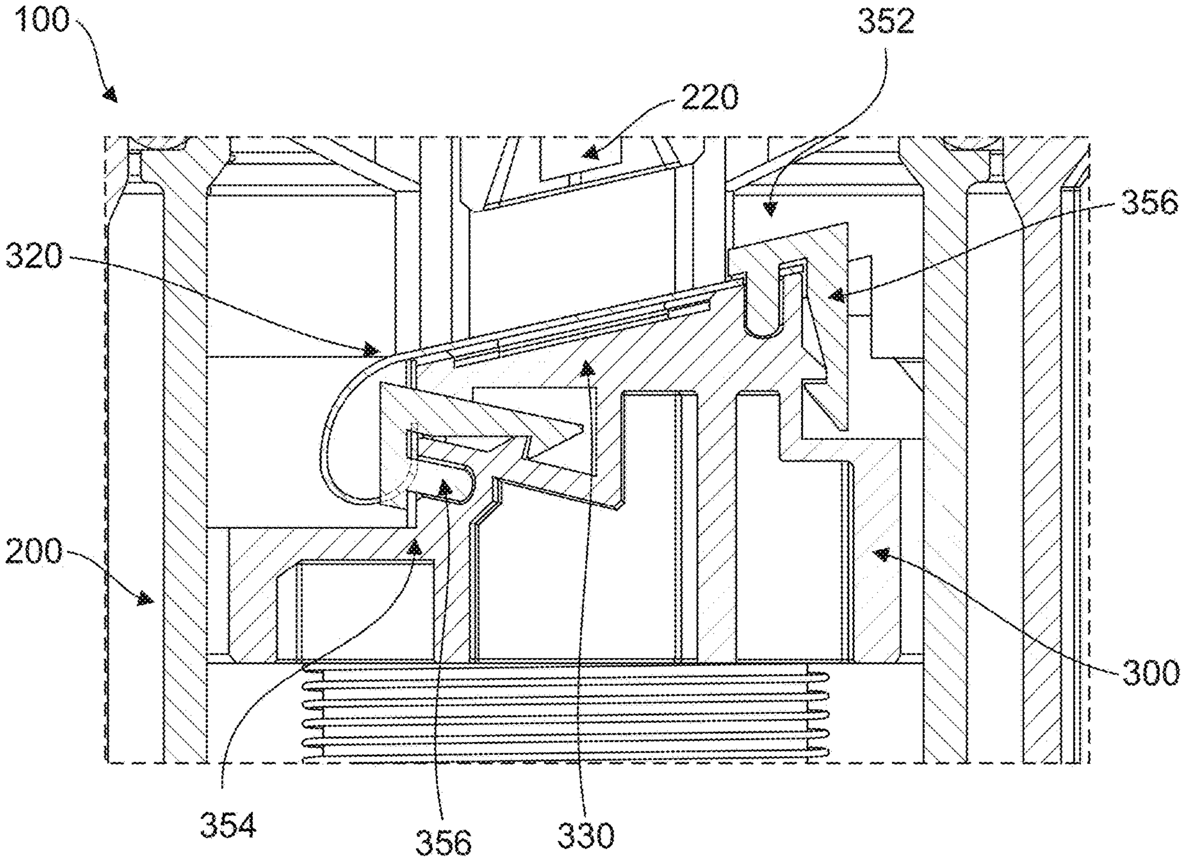
FIG. 12 is a schematic fragmentary cross-sectional side view of a float assembly with ribbon installed, according to particular embodiments.

FIG. 11A is a schematic illustrating a perspective view of a float assembly with ribbon installed, according to particular embodiments. FIG. 11B comprises schematic perspective views of a ribbon attachment clip, according to particular embodiments. FIG. 12 is a schematic fragmentary cross-sectional side view of a float assembly with ribbon installed, according to particular embodiments.

In particular embodiments, ribbon attachments may have structure and form to suitably secure and constrain the ribbon, as described herein. In particular embodiments, ribbon attachment may separately or additionally be configured for durability, case of manufacturing, and/or case of assembly. In particular embodiments, ribbon attachments may comprise, as non-limiting examples, one or more levers, clips, buttons, posts, split-posts, notches, hinges, and/or snap fits. By way of example and not limitation, FIGS. 7 and 9A illustrate buttons provided on float assembly 300 as first ribbon attachment 352 and second ribbon attachment 354, configured to engage with and secure respective through-holes 326 of ribbon 320. By way of example and not limitation, FIGS. 10A-10C illustrate particular embodiments of a clip 356. By way of example and not limitation, FIGS. 11A-11B and FIG. 12 illustrate another embodiment of a clip 356.

In particular embodiments, clip 356 may comprise one or more posts, such as post 358. In particular embodiments, one or more posts of clip 356 may be configured to pass through one or more respective through-holes 326 of ribbon 320. In particular embodiments, clip 356 may comprise one or more features comprising a hook or latch 357, which may be configured to engage with float assembly 300. In particular embodiments, float assembly 300 may be provided with suitable features for engaging with each hook or latch 357 of each clip 356. In particular embodiments, clip 356 may comprise one or more notch features, such as notch 359.

The benefits and advantages of the inventive concepts are now believed to have been amply illustrated in view of the exemplary embodiments disclosed.

Miscellaneous

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. For example, it is possible that each of the characteristics described in one of the examples of an embodiment can be combined with one or a plurality of other desired characteristics from other embodiments, resulting in other embodiments that may not be described in words or by reference to the drawings, but which are fully contemplated. It will also be understood that changes and modifications may be made by those of ordinary skill within the scope of the disclosure, illustrations, and/or the following claims. Such variations are fully contemplated herein and not to be regarded as a departure from the disclosure, and all such modifications are intended to be included within the scope of the disclosure.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

It should be noted that figures provided herein may be illustrated schematically rather than literally or precisely; components and aspects of the figures may not necessarily be to scale. Moreover, while like reference labels or numerals may designate corresponding parts throughout the different views in many cases, like parts may not always be provided with like reference numerals or labels in each view. Further, like parts may not be labeled in every view or figure. Numerical ranges recited in this application should be construed to be inclusive of the end points of the stated ranges. Particular axes, such as one or more rotational, lateral and/or longitudinal axes, which may be omitted herein in some illustrations, should be construed to exist in every illustration or situation where it is referred to, or to which it reasonably corresponds.

The invention claimed is:

1. A method of assembling a valve assembly, comprising:

providing a float assembly within a housing of the valve assembly based on slidably coupling a core section of the float assembly with one or more guiding structures of the housing;

providing a platform on an upper surface of the float assembly, the platform angled relative to a plane orthogonal to a longitudinal axis of the housing;

securing a first end of a membrane to a first attachment of the float assembly, wherein the membrane is elongated along a lengthwise axis, and wherein, corresponding to an uppermost position of the float assembly along the longitudinal axis, the membrane is configured to cover and seal a vent orifice and at least a portion of the membrane is supported by the platform; and securing a second end of the membrane to a second attachment of the float assembly, wherein a slack portion of the membrane is associated with the second end, and wherein at least a part of the slack portion of the membrane comprises a curvature about an axis perpendicular to the lengthwise axis of the membrane.

2. A valve assembly comprising:

a housing having an inner chamber, an upper surface of the inner chamber provided with a vent orifice in fluid communication with a vent outlet;

a float assembly provided within the inner chamber, the float assembly movable along a longitudinal axis of the housing, the float assembly comprising a platform disposed on an upper surface of the float assembly, the platform angled relative to a plane orthogonal to the longitudinal axis; and a membrane elongated along a lengthwise axis and comprising a first end secured to a first attachment of the float assembly, a second end provided opposite the first end and secured to a second attachment of the float assembly, and a slack portion associated with the second end, wherein, corresponding to an uppermost position of the float assembly along the longitudinal axis, the membrane is configured to cover and seal the vent orifice, at least a portion of the membrane being supported by the platform, wherein, based on the float assembly moving away from the uppermost position, the membrane is configured to reopen the vent orifice, the reopening associated with the first end initiating a peeling away of the membrane from the vent orifice, and wherein at least a part of the slack portion of the membrane comprises a curvature about an axis perpendicular to the lengthwise axis of the membrane.

3. The valve assembly of claim 2, wherein the vent orifice comprises an elongated section aligned with the lengthwise axis of the membrane.

4. The valve assembly of claim 2, wherein the slack portion of the membrane facilitates the sealing of the vent orifice by facilitating alignment and constraint of the membrane relative to the vent orifice.

5. The valve assembly of claim 2, wherein an upper surface of the platform comprises a cavity.

6. The valve assembly of claim 5, wherein the cavity comprises an elongated section aligned with the lengthwise axis of the platform.

7. The valve assembly of claim 5, wherein the cavity comprises a protruding ridge oriented along the lengthwise axis of the platform.

8. The valve assembly of claim 5, wherein the platform comprises a channel or a groove provided at a peripheral edge of the cavity.

9. The valve assembly of claim 2, wherein the float assembly further comprises a hollow core section.

10. The valve assembly of claim 9, wherein the hollow core section of the float assembly is slidably coupled to the housing of the valve assembly.

11. The valve assembly of claim 2, wherein the first attachment is offset from the second attachment along the longitudinal axis, the first attachment offset toward the upper surface of the inner chamber relative to the second attachment.

12. The valve assembly of claim 2, wherein the platform is angled relative to the plane orthogonal to the longitudinal axis at an angle between five and thirty degrees.

13. The valve assembly of claim 2, wherein the membrane comprises a fluoroelastomer.

14. The valve assembly of claim 13, wherein the fluoroelastomer is reinforced by one or more polymers.

15. The valve assembly of claim 2, wherein, corresponding to the uppermost position of the float assembly, at least a portion of the membrane is sandwiched between the platform and the vent orifice to seal the vent orifice.

16. The valve assembly of claim 2, further comprising a clip fastener for securing at least one of the first end or the second end of the membrane to the respective attachment of the float assembly.

17. The valve assembly of claim 16, wherein the clip fastener comprises a post configured to operatively couple with one or more of the membrane or the float assembly.

18. The valve assembly of claim 17, wherein the membrane comprises at least one through-hole configured to engage with the post.

19. The valve assembly of claim 16, wherein the clip fastener comprises one or more of a hook or a notch configured to operatively couple with the float assembly.

20. A valve assembly system comprising:

a first valve assembly;

a second valve assembly in fluid communication with the first valve assembly; and a vent outlet in fluid communication with the first valve assembly, wherein the first valve assembly comprises:

a housing having an inner chamber, an upper surface of the inner chamber provided with a vent orifice in fluid communication with the vent outlet;

a float assembly provided within the inner chamber, the float assembly movable along a longitudinal axis of the housing, the float assembly comprising a platform disposed on an upper surface of the float assembly, the platform angled relative to a plane orthogonal to the longitudinal axis; and a membrane elongated along a lengthwise axis and comprising a first end secured to a first attachment of the float assembly, a second end provided opposite the first end and secured to a second attachment of the float assembly, and a slack portion associated with the second end, wherein, corresponding to an uppermost position of the float assembly along the longitudinal axis, the membrane is configured to cover and seal the vent orifice, at least a portion of the membrane being supported by the platform, wherein, based on the float assembly moving away from the uppermost position, the membrane is configured to reopen the vent orifice, the reopening associated with the first end initiating a peeling away of the membrane from the vent orifice, and wherein at least a part of the slack portion of the membrane comprises a curvature about an axis perpendicular to the lengthwise axis of the membrane.

* * * * *